United States Patent
Kim et al.

(10) Patent No.: US 11,010,308 B2
(45) Date of Patent: May 18, 2021

(54) OPTIMIZING DATA PARTITIONING AND REPLACEMENT STRATEGY FOR CONVOLUTIONAL NEURAL NETWORKS

(71) Applicant: LG ELECTRONICS INC., Seoul (KR)

(72) Inventors: Jaewon Kim, Seoul (KR); Thi Huong Giang Nguyen, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 167 days.

(21) Appl. No.: 16/428,748

(22) Filed: May 31, 2019

(65) Prior Publication Data

US 2020/0050555 A1   Feb. 13, 2020

Related U.S. Application Data

(60) Provisional application No. 62/716,999, filed on Aug. 10, 2018.

(51) Int. Cl.
  *G06F 12/126* (2016.01)
  *G06N 20/10* (2019.01)
  *G06N 3/063* (2006.01)

(52) U.S. Cl.
  CPC ........... *G06F 12/126* (2013.01); *G06N 3/063* (2013.01); *G06N 20/10* (2019.01)

(58) Field of Classification Search
  CPC ........ G06F 12/00–16; G06N 3/02–105; G06N 20/10
  See application file for complete search history.

(56) References Cited

U.S. PATENT DOCUMENTS

| | | | |
|---|---|---|---|
| 2010/0088490 A1* | 4/2010 | Chakradhar | G06N 3/084 712/34 |
| 2018/0018586 A1 | 1/2018 | Kobayashi et al. | |
| 2018/0129893 A1 | 5/2018 | Son et al. | |
| 2018/0137406 A1* | 5/2018 | Howard | G06N 3/082 |

(Continued)

FOREIGN PATENT DOCUMENTS

CN   107437110   12/2017

OTHER PUBLICATIONS

PCT International Application No. PCT/KR2019/010105, Written Opinion of the International Searching Authority dated Nov. 28, 2019, 8 pages.

(Continued)

*Primary Examiner* — Nicholas J Simonetti
(74) *Attorney, Agent, or Firm* — Lee, Hong, Degerman, Kang & Waimey PC

(57) ABSTRACT

Embodiments of the present disclosure include method for optimizing an internal memory for calculation of a convolutional layer of a convolutional neural network (CNN), the method including determining a computation cost of calculating the convolutional layer using each combination of a memory management scheme of a plurality of memory management schemes and data partition sizes of input feature map (IFM) data, kernel data, and output feature map (OFM) data to be loaded in the internal memory; identifying one combination of a memory management scheme and data partition sizes having a lowest computation cost for the convolutional layer; and implementing the CNN to use the one combination for calculation of the convolutional layer.

35 Claims, 22 Drawing Sheets

(56) References Cited

U.S. PATENT DOCUMENTS

2020/0005151 A1* 1/2020 Jiang .................. G06N 3/04
2020/0349449 A1* 11/2020 Wang .................. G06T 11/00

OTHER PUBLICATIONS

Li, J. et al., "SmartShuttle: Optimizing off-chip memory accesses for deep learning accelerators," In: 2018 Design, Automation & Test in Europe Conference & Exhibition (DATE), Mar. 2018, 7 pages.
Shen, Y. et al., "Maximizing CNN Accelerator Efficiency Through Resource Partitioning," In: ISCA '17 Proceedings of the 44th Annual International Symposium on Computer Architecture, Jun. 2017, 14 pages.

* cited by examiner

FIG. 9

```
Input: conv_size = <N, C, H, W, K, R, S>,
       mem_size = <D_I, D_O, D_K>
Output: partition = <P_K, P_C, P_H, P_W, P_L, P_W>,
        min_cost Algorithm:
min_partition = <>
min_cost = ∞
min_policy = NULL
for each replace_scheme in [IFM_OFM, IFM_KNL, IFM_KNL, KNL_IFM, KNL_OFM, OFM_IFM, OFM_KNL]
    cost, partition = find_partition(conv_size, mem_size, replace_policy)
    if (cost < min_cost)
        min_cost = cost
        min_partition = partition
        min_policy = replace_policy
```

```
Input:  conv_size = <N, C, H, W, K, R, S>,
        mem_size = <D_I, D_O, D_K>,
        replace_policy
Output: min_partition = <P_K, P_C, P_H, P_W, P_L, P_M>,
        min_cost Algorithm:
min_partition = <>
min_cost = ∞
for (p_h=1; p_h<H; p_h++)
  for (p_w=1; p_w<W; p_w++)
    p_c = D_I / (p_h*p_w)
    p_k = D_K / (p_c*R*S)
    <p_L, p_M> = f(<p_h, p_w>)
    partition = <p_K, p_C, p_h, p_w, p_L, p_M>
    if((replace_policy == OFM_IFM or replace_policy == OFM_KNL)
       and (p_k* p_L* p_M > D_O))
      continue   // skip if OFM partition > D_o in OFM stationary schemes
    cost = calculate_cost(partition, conv_size, replace_policy)
    if (cost < min_cost)
      min_cost = cost
      min_partition = partition
```

FIG. 10

Input: partition = $<P_K, P_C, P_H, P_W, P_L, P_M>$,
       conv_size = $<N, K, C, H, W, L, M>$,
       replace_policy
Output: cost
Algorithm:
   $reload_{ifm}$ = ifm_reload(replace_policy, partition, conv_size)
   $reload_{kernel}$ = kernel_reload(replace_policy, partition, conv_size)
   $reload_{ofm}$ = ofm_reload(replace_policy, partition, conv_size)
   reloads = $<reload_{ifm}, reload_{kernel}, reload_{ofm}>$
   cost = calculate the cost based on conv_size and reloads

FIG. 11

```
for(n=0; n<N; n++)                                              // N loop
  for(c=0; c<C; c+=P_C)                                         // C loop
    for(h=0; h<H; h+=P_H)                                       // H loop
      for(w=0; w<W; w+=P_W)                                     // W loop
        load_input<1, P_C, P_H, P_W>
        for(k=0; k<K; k+=P_K)                                   // K loop
          load_kernel<P_K, P_C, R, S>
          for(t_k=k; t_k<k+P_K; t_k++)
            if (P_K* P_L* P_M > D_0) and (c > 0)
              load_output<1, 1, P_L, P_W>
            for(t_c=c; t_c<c+P_C; t_c++)
              for(t_h=h; t_h<h+P_H; t_h++)
                for(t_w=w; t_w<w+P_W; t_w++)
                  for(r=0; r<R; r++)
                    for(s=0; s<S; s++)
                      out[n][t_k][t_h][t_m] += in[n][t_c][t_h][t_w] *
                                               kernel[t_k][t_c][r][s]
            if(P_K* P_L* P_M) > D_0                             // ofm_reload > 1
              store_output<1, 1, P_L, P_W>
          if(P_K* P_L* P_M) <= D_0                              // ofm_reload = 1
            store_output<1, P_K, P_L, P_W>
```

FIG. 12

```
for(n=0; n<N; n++)                                          // N loop
  for(h=0; h<H; h+=P_H)                                     // H loop
    for(w=0; w<W; w+=P_W)                                   // W loop
      for(c=0; c<C; c+=P_C)                                 // C loop
        load_input<1, P_C, P_H, P_W>
        for(k=0; k<K; k+=P_R)                               // K loop
          load_kernel<P_K, P_C, R, S>
          for(t_k=k; t_k<k+P_K; t_k++)
            if ((P_K* P_L* P_M) > D_0) and (c > 0)
              load_output<1, 1, P_L, P_M>
            for(t_c=c; t_c<c+P_C; t_c++)
              for(t_h=h; t_h<h+P_H; t_h++)
                for(t_w=w; t_w<w+P_W; t_w++)
                  for(r=0; r<R; r++)
                    for(s=0; s<S; s++)
                      out[n][t_k][t_h][t_m]+=in[n][t_c][t_h][t_w]*
                                              kernel[t_k][t_c][t_r][t_s]
            if((P_K* P_L* P_M) > D_0                        // ofm_reload > 1
              store_output<1, 1, P_L, P_M>
            if((P_K* P_L* P_M) <= D_0                       // ofm_reload = 1
              store_output<1, P_K, P_L, P_M>
```

FIG. 13

```
for(n=0; n<N; n++)                                          // N loop
  for(k=0; k<K; k+=P_K)                                     // K loop
    for(c=0; c<C; c+=P_C)                                   // C loop
      load_kernel<P_K, P_C, R, S>
      for(h=0; h<H; h+=P_H)                                 // H loop
        for(w=0; w<W; w+=P_W)                               // W loop
          load_input<1, P_C, P_H, P_W>
          for(t_k=k; t_k<k+P_K; t_k++)
            if (P_K* P_L* P_M > D_O) and (c > 0)
              load_output<1, 1, P_L, P_W>
            for(t_c=c; t_c<c+P_C; t_c++)
              for(t_h=h; t_h<h+P_H; t_h++)
                for(t_w=w; t_w<w+P_W; t_w++)
                  for(r=0; r<R; r++)
                    for(s=0; s<S; s++)
                      out[n][t_k][t_h][t_w]+=in[n][t_c][t_h][t_w]*
                                             kernel[t_k][t_c][r][s]
            if (P_K* P_L* P_M) > D_O                        // ofm_reload > 1
              store_output<1, 1, P_L, P_M>
            if (P_K* P_L* P_M) <= D_O                       // ofm_reload = 1
              store_output<1, P_K, P_L, P_M>
```

FIG. 14

```
for(n=0; n<N; n++)                                    // N loop
 for(k=0; k<K; k+=P_K)                                // K loop
  load_kernel<P_K, C, R, S>
  for(h=0; h<H; h+=P_H)                               // H loop
   for(w=0; w<W; w+=P_W)                              // W loop
    for(c=0; c<C; c+=P_C)                             // C loop
     load_input<1, P_C, P_H, P_W>
     for(t_k=k; t_k<k+P_K; t_k++)
      if (P_K* P_W > D_0) and (c > 0)
       load_output<1, 1, P_L, P_W>
      for(t_c=c; t_c<c+P_C; t_c++)
       for(t_h=h; t_h<h+P_H; t_h++)
        for(t_w=w; t_w<w+P_W; t_w++)
         for(r=0; r<R; r++)
          for(s=0; s<S; s++)
           out[n][t_k][t_h][t_w]+=in[n][t_c][t_h][t_w]*
                                   kernel[t_k][t_c][r][s]
      if (P_K* P_L* P_W) > D_0                        // ofm_reload > 1
       store_output<1, 1, P_L, P_W>
     if (P_K* P_L* P_W) <= D_0                        // ofm_reload = 1
      store_output<1, P_K, P_L, P_W>
```

FIG. 15

```
for(n=0; n<N; n++)                              // N loop
 for(h=0; h<H; h+=P_H)                          // H loop
  for(w=0; w<W; w+=P_W)                         // W loop
   for(k=0; k<K; k+=P_K)                        // K loop
    for(c=0; c<C; c+=P_C)                       // C loop
     load_input<1, P_C, P_H, P_W>
     load_kernel<P_R, P_C, R, S>
     for(t_k=k; t_k<k+P_K; t_k++)
      for(t_c=c; t_c<c+P_C; t_c++)
       for(t_h=h; t_h<h+P_H; t_h++)
        for(t_w=w; t_w<w+P_W; t_w++)
         for(r=0; r<R; r++)
          for(s=0; s<S; s++)
           out[n][t_k][t_h][t_w]+=in[n][t_c][t_h][t_w]*
                                   kernel[t_k][t_c][r][s]
     store_output<1, P_K, P_K>
```

```
for(n=0; n<N; n++)                              // N loop
  for(k=0; k<K; k+=P_K)                         // K loop
    load_kernel<P_K, C, R, S>
    for(h=0; h<H; h+=P_H)                       // H loop
      for(w=0; w<W; w+=P_W)                     // W loop
        for(c=0; c<C; c+=P_C)                   // C loop
          load_input<1, P_C, P_H, P_W>
          for(t_k=k; t_k<k+P_K; t_k++)
            for(t_c=c; t_c<c+P_C; t_c++)
              for(t_h=h; t_h<h+P_H; t_h++)
                for(t_w=w; t_w<w+P_W; t_w++)
                  for(r=0; r<R; r++)
                    for(s=0; s<S; s++)
                      out[n][t_k][t_h][t_w]+=in[n][t_c][t_h][t_w]*
                                             kernel[t_k][t_c][r][s]
          store_output<1, P_K, P_L, P_W>
```

FIG. 17

OPTIMIZING DATA PARTITIONING AND REPLACEMENT STRATEGY FOR CONVOLUTIONAL NEURAL NETWORKS

CROSS-REFERENCE TO RELATED APPLICATIONS

Pursuant to 35 U.S.C. § 119(e), this application claims the benefit of U.S. Provisional Patent Application No. 62/716,999, filed on Aug. 10, 2018, the contents of which are hereby incorporated by reference herein in its entirety.

BACKGROUND

Convolutional Neural Networks (CNN) have become a highly useful tool for artificial intelligence tasks such as image classification and processing. Early CNN algorithms demanded huge amounts of computing power and implementations are commonly executed in cloud computing and high powered server systems. However, as the algorithms have been improved, the requirements of computing power have been mitigated, producing even better performance while using less resources. As a result, CNN applications are becoming increasingly popular and smaller, less powerful devices, such as consumer electronics, home appliance products, personal and mobile devices, are benefitting from CNN enabled implementations for tasks such as object classification, object detection, object recognition, image segmentation, language processing, and more.

However, many of these smaller and less-powerful devices may still have certain limitations on hardware computing power due to various reasons such as cost, form factor, and power consumption which limit their ability to effectively and efficiently run robust CNN implementations.

The performance of CNN algorithms is mainly dependent on two factors: matrix computation capability and memory access time, with memory access time becoming the more critical factor in determining algorithm performance in most cases. The limitations on performance are exacerbated when considering embedded systems, which have lower arithmetic computation capabilities as well as smaller internal memory (SRAM) and external memory (DRAM). CNN algorithms manage vast amount of data, including input, output, and kernels. In order to maximize the utilization of the available arithmetic units, data needs to be loaded into the internal memory from the external memory prior to computation and the computation results must be temporarily stored in internal memory before the computation results are moved back to external memory.

In modern embedded systems, such as those found in consumer electronics and home appliance products, this memory management approach may be too costly. CNN data is often too large to fit in the internal memories of embedded systems. Additionally, CNN data may need to be reused an extremely large number of times—upwards of thousands or tens of thousands of times—during calculation of the convolutional layers. Thus, it is desirable to reduce system throughput by keeping as much CNN data loaded in the internal memory until all convolutional layer calculations requiring the loaded data are completed. However as noted, due to the limited amount of internal memory in embedded systems, it may be necessary to reload the same CNN data from the external memory into the internal memory multiple times, leading to added cost by utilizing more hardware resources such as memory bandwidth, thereby increasing processing time and consuming more power.

Traditional methods of optimizing memory use for CNNs, typically involving arbitrarily selected partitioning of inputs, kernels, and outputs of the CNNs, have failed to provide effective optimization which takes into consideration the multi-dimensional aspects of the CNN data (e.g. height, width, depth), as well as providing an approach which is equally effective and applicable to a widely varying set of dimensional values. Thus, the existing systems and methods are unable to provide a solution for optimizing data partitioning of CNN data and determining an optimal memory management scheme for managing an internal memory during convolutional layer calculations for CNNs. Therefore, it may be advantageous to provide an optimization method for optimal data partitioning and memory management for use in CNNs to reduce the memory bandwidth requirement and improve performance of CNNs in a wide range of implementations including embedded systems.

SUMMARY

Embodiments of the present disclosure include systems, methods, and computer-readable media for optimizing memory management for implementations of convolutional neural networks (CNN). In some embodiments, the optimization may include selection of a memory replacement policy which determines a type of data to be prioritized over other types of data which are used for calculations of convolutional layers of the CNN. In some embodiments, the memory replacement policy may identify a type of data among input feature map (IFM) data, kernel data, or output feature map (OFM) data to maintain in an internal memory of a system. In some embodiments, the memory replacement policy may further identify a second type of data among the IFM, kernel, and OFM data to prioritize over a third type of data among the IFM, kernel, and OFM data for managing the internal memory. In some embodiments, optimum partition sizes of the IFM data, kernel data, and OFM data may be determined for loading into the internal memory given a particular memory replacement policy. In yet other embodiments, all combinations of memory replacement policies and data partition sizes of the IFM data, kernel data, and OFM data may be used to calculate the convolutional layer, and a combination with a lowest computation cost may be selected for optimizing the convolutional layer. In some embodiments, the combination with the lowest computation cost may be identified using an exhaustive search method.

An embodiment of a method of the present disclosure for optimizing an internal memory for calculation of a convolutional layer includes determining a computation cost of calculating the convolutional layer using each combination of a memory management scheme of a plurality of memory management schemes and data partition sizes of input feature map (IFM) data, kernel data, and output feature map (OFM) data to be loaded in the internal memory; identifying one combination of a memory management scheme and data partition sizes having a lowest computation cost for the convolutional layer; and implementing the CNN to use the one combination for calculation of the convolutional layer.

An embodiment of a machine-readable non-transitory medium of the present disclosure includes machine-readable non-transitory medium having stored thereon machine-executable instructions for optimizing a convolutional layer of a convolutional neural network, the instructions including for each of a plurality of internal memory replacement schemes, wherein each internal memory replacement scheme identifies one of input feature map (IFM) data, kernel data, or output feature map (OFM) data to maintain in an internal memory until all calculations requiring said one of the IFM data, kernel data, or OFM data for the convolutional layer are completed, identify optimal data partition sizes of the IFM data, the kernel data, and the OFM data which minimizes a computation cost for the convolutional layer given each corresponding internal memory replacement scheme; determining a combination of a selected one of the plurality of internal memory replacement schemes with corresponding optimal partition sizes of the IFM data, the kernel data, and the OFM data having a lowest computation cost among all combinations of the plurality of internal memory replacement schemes and corresponding optimal partition sizes; and implementing the CNN to use the selected one of the plurality of internal memory replacement schemes with the corresponding optimal partition sizes of the IFM data, the kernel data, and the OFM data for calculation of the convolutional layer.

An embodiment of a method of the present disclosure for optimizing a convolutional layer of a convolutional neural network includes for each of a plurality of internal memory replacement schemes, wherein each internal memory replacement scheme identifies one of input feature map (IFM) data, kernel data, or output feature map (OFM) data to maintain in an internal memory until all calculations requiring said one of the IFM data, kernel data, or OFM data for the convolutional layer are completed, identify optimal data partition sizes of the IFM data, the kernel data, and the OFM data which minimizes a computation cost for the convolutional layer given each corresponding internal memory replacement scheme; determining a combination of a selected one of the plurality of internal memory replacement schemes with corresponding optimal partition sizes of the IFM data, the kernel data, and the OFM data having a lowest computation cost among all combinations of the plurality of internal memory replacement schemes and corresponding optimal partition sizes; and implementing the CNN to use the selected one of the plurality of internal memory replacement schemes with the corresponding optimal partition sizes of the IFM data, the kernel data, and the OFM data for calculation of the convolutional layer An embodiment of a system of the present disclosure for optimizing a convolutional layer for a convolutional neural network includes means for identifying, for each of a plurality of internal memory replacement schemes, wherein each internal memory replacement scheme identifies one of input feature map (IFM) data, kernel data, or output feature map (OFM) data to maintain in an internal memory until all calculations requiring said one of the IFM data, kernel data, or OFM data for the convolutional layer are completed, optimal data partition sizes of the IFM data, the kernel data, and the OFM data which minimizes a computation cost for the convolutional layer given each corresponding internal memory replacement scheme; determining a combination of a selected one of the plurality of internal memory replacement schemes with corresponding optimal partition sizes of the IFM data, the kernel data, and the OFM data having a lowest computation cost among all combinations of the plurality of internal memory replacement schemes and corresponding optimal partition sizes; and implementing the CNN to use the selected one of the plurality of internal memory replacement schemes with the corresponding optimal partition sizes of the IFM data, the kernel data, and the OFM data for calculation of the convolutional layer.

An embodiment of a system of the present disclosure for optimizing a convolutional layer for a convolutional neural network includes one or more processors configured to identify, for each of a plurality of internal memory replacement schemes, wherein each internal memory replacement scheme identifies one of input feature map (IFM) data, kernel data, or output feature map (OFM) data to maintain in an internal memory until all calculations requiring said one of the IFM data, kernel data, or OFM data for the convolutional layer are completed, optimal data partition sizes of the IFM data, the kernel data, and the OFM data which minimizes a computation cost for the convolutional layer given each corresponding internal memory replacement scheme; determine a combination of a selected one of the plurality of internal memory replacement schemes with corresponding optimal partition sizes of the IFM data, the kernel data, and the OFM data having a lowest computation cost among all combinations of the plurality of internal memory replacement schemes and corresponding optimal partition sizes; and implement the CNN to use the selected one of the plurality of internal memory replacement schemes with the corresponding optimal partition sizes of the IFM data, the kernel data, and the OFM data for calculation of the convolutional layer.

BRIEF DESCRIPTION OF THE DRAWINGS

The above and other aspects and features of the present disclosure will become more apparent upon consideration of the following description of embodiments, taken in conjunction with the accompanying drawing figures.

FIG. 9 is algorithm of a method of identifying the optimal partition sizes and replacement policy of a convolutional layer of a CNN according to an embodiment of the present disclosure.

FIG. 10 is algorithm of a method of finding the cost of partitions of CNN data given a particular replacement policy according to an embodiment of the present disclosure.

FIG. 11 is algorithm of a method of calculating data transfer costs for a convolutional layer of a CNN according to an embodiment of the present disclosure.

FIGS. 12, 13, 14, 15, 16, and 17 are algorithms of iterating through partitioned data for various memory replacement policies for calculating a convolutional layer of a CNN according to an embodiment of the present disclosure.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system, method, and computer-readable medium for optimizing data partitioning and memory management for convolutional neural network calculations. While benefits of the invention are discussed with respect to CNN implementations in dedicated consumer electronics and embedded systems, the disclosure is not limited thereto, and it will be appreciated that the invention is applicable to various implementations, including multi-function and fully implemented computing systems and devices. Additionally, the methods and operations are discussed with respect to convolutional layer calculations in CNNs, however it will be understood by those of ordinary skill in the art that the disclosure may be applied to other layers of a CNN for optimization.

Figure 1A:
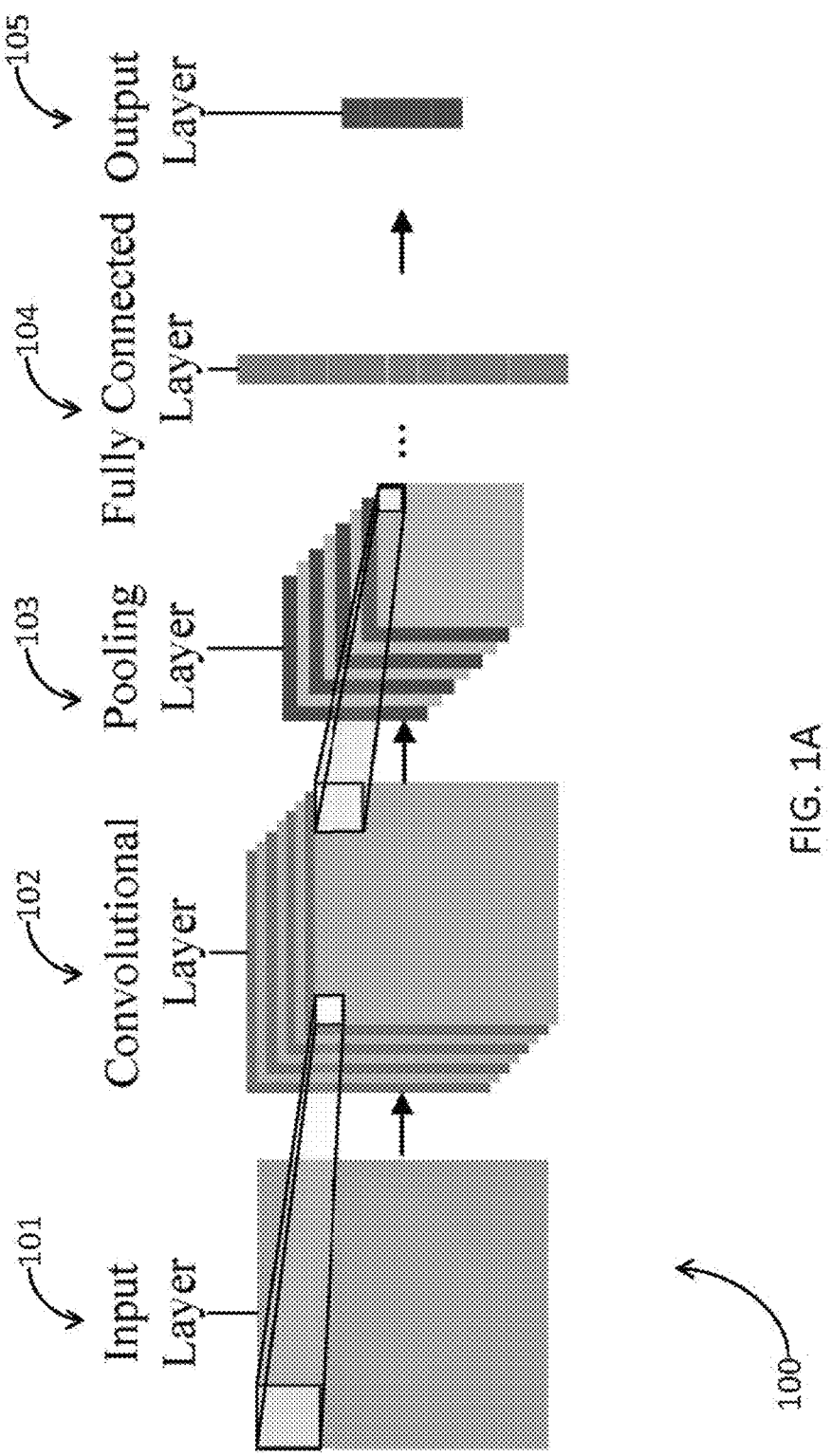
FIGS. 1A, 1B, 2 are illustrations of various aspects of a convolutional neural network according to the existing art.

By way of background, a convolutional neural network (CNN) algorithm consists of multiple convolutional layers, pooling layers, activation layers, and fully-connected layers. FIG. 1A shows a generalized example of a CNN 100 comprising an input layer 101, convolutional layers 102, pooling layers 103, a fully connected layer 104, and an output layer 105 which includes a single vector of probability scores used in artificial intelligence decisions, such as object or facial recognition.

In a convolution layer 102, the original input 101 is convolved with a set of filters (not depicted), otherwise referred to as kernels, designed to highlight specific characteristics of the input 101. While CNNs may be used in various applications such as image processing or audio processing, this disclosure will use examples related to image processing and recognition. However, it will be understood by those of ordinary skill that the disclosure may be applied to CNN implementations for use in various input types and purposes.

The convolution layer 102 may include an activation layer (not depicted) to enhance the nonlinear property of the network by introducing an activation function—such as a rectified linear unit (ReLU) activation function, wherein values that are less than or equal to zero become zero and all positive values remain the same.

The pooling layer 103 produces a scaled down version of the output from the convolution layer 102. This is achieved by considering small groupings of pixel regions and applying a desired operational filter (e.g., min, max, mean, etc.) across the pixel grouping to produce a single representation. The output of the multiple convolution layers 102 and pooling layers 103 may be output to the input of fully connected layers 104 comprising a deep neural network, having an input layer, hidden layers, and an output layer (not depicted) for generating an output 105 for classifying the input image. The fully connected layer 104 provides a high-level reasoning by connecting each node in the layer to all activation nodes in the previous layer, and in many cases provides a traditional multi-layer perceptron neural network (MLP).

As the focus of this disclosure is on optimization of data partitioning and memory management for convolutional layer calculations, additional brief background of the convolutional layer will be discussed. The convolutional layer is the core building block of a CNN. The layer's parameters consist of a set of learnable kernels (or filters), which have a small receptive field, but extend through the full depth of the input volume.

Figure 1B:
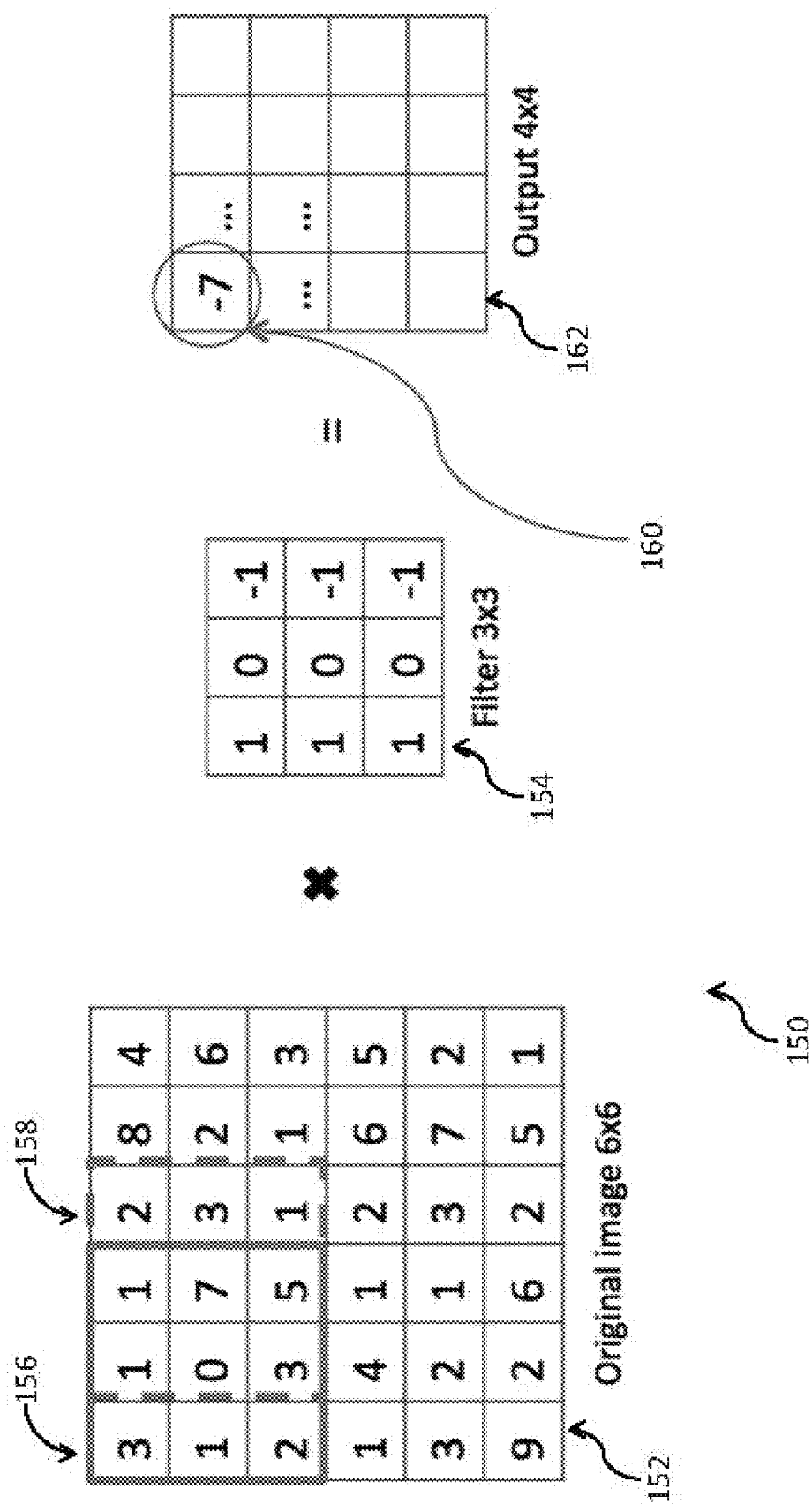

FIG. 1B shows a simplified two-dimensional example of a convolution calculation 150 using a single channel of a 6×6 input feature map 152 and a 3×3 kernel 154. It will be understood that the convolutions are performed in three dimensions in typical CNNs, and FIG. 1B is simplified for the purposes of discussion. During the forward pass, each kernel 154 is convolved, or slid, across the width and height of the input feature map 152 according to a stride which determines how many elements, or pixels, are traversed by the kernel for each convolution. For example, a position of the kernel during a first convolution is shown at position 156 and indicated by a solid line surrounding the first 3×3 position. For a next second convolution, given a stride of 1 pixel, the kernel is slid across the input feature map by 1 pixel, shown at position 158 and indicated by a dotted line surrounding the next 3×3 position.

For each convolution, the sum of element-wise multiplication between the entries of the 3×3 kernel 154 and each 3×3 selection of the input feature map 152, for example the first 3×3 selection at 156, are calculated, where each dot product results in a single value 160 to be output to a corresponding matrix position in the output feature map 162, as shown in FIG. 1B. Completion of all convolutions produces a 2-dimensional 4×4 output feature map 162, or activation map.

As a result, the CNN may learn a large number of kernels, such as kernel 154, which activate when it detects a specific type of feature at some spatial position in the input feature map 152. As the size of the output feature map 162 is smaller than the input feature map 152, padding may be utilized to add a layer of zero-value elements to surround the input feature map 152 with zeros at each layer so that the input feature map 152 will not continually shrink and to maintain compatibility with the kernel 154 and stride.

Stacking the output feature maps 162 for all kernels 154 along the depth dimension forms the full output feature map of the convolution layer. Every entry in the output volume can thus also be interpreted as an output of a neuron that looks at a small region in the input and shares parameters with neurons in the same activation map. Each channel of the kernel in the third dimension represents another 3×3 kernel 154 to be convolved over all channels of the input feature map 154 to produce a three-dimensional output feature map 162.

Figure 2:
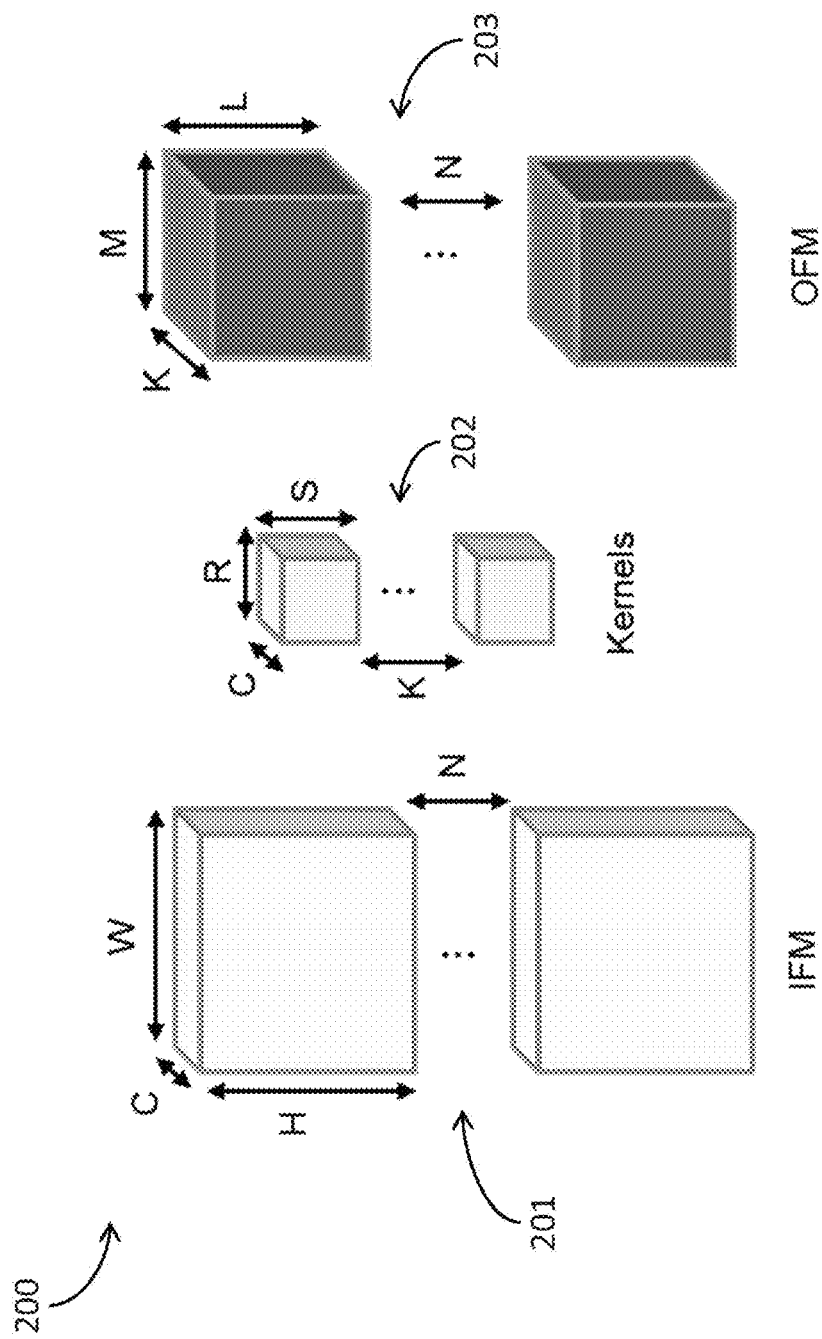

FIG. 2 shows a simplified representation of the various parameters 200 of a three-dimensional convolutional layer, including the three-dimensional input feature maps (IFM) 201, kernels 202, and output feature maps (OFM) 203. As shown in FIG. 2, a set of IFM 201 has four dimensions: N×C×H×W, where N represents batch size, C represents a number of IFM channels, H represents a dimensional height of the IFM, and W represents a dimensional width of the IFM.

A set of kernels 202 also has four dimensions: K×C×R×S, where K represents a number of kernels, C represents a number of kernel channels, R represents a dimensional height of the kernels, and S represents a dimensional width of the kernels. Note that the number of IFM 201 channels and the number of kernel 202 channels have a same number of channels, C. For most RGB-pixel based images input to a CNN, the value of C for an initial input to a convolutional layer will be 3, corresponding to three color channels of an image: red, blue, and green.

A set of OFM 203 also has four dimensions: N×K×L×M, where N represents batch size, K represents a number of OFM channels, L represents a dimensional height of each OFM, and M represents a dimensional width of each OFM. Note that the number of channels of the OFM 203, represented by K, corresponds to the number of kernels 202 K, since each OFM channel is generated by convolving an entire kernel of 202 over the entire channels of the IFM.

As discussed, the fundamental operation of a three-dimensional convolutional layer is a 2-dimensional sliding-window convolution of the R×S-element kernel 202 over an H×W-element IFM 201 channel, or plane. Each distinct kernel plane of C channels from a kernel 202 is applied to each plane of the IFM 201 and all of C channels are accumulated element-wise to produce an L×M OFM 203 plane. K kernels 202 are applied to a C×H×H×W IFM 201 to produce K number of OFM 203 planes, with dimensions K×L×M. A batch of input data produces N instances of OFM 203, as shown in FIG. 2.

Figure 3:
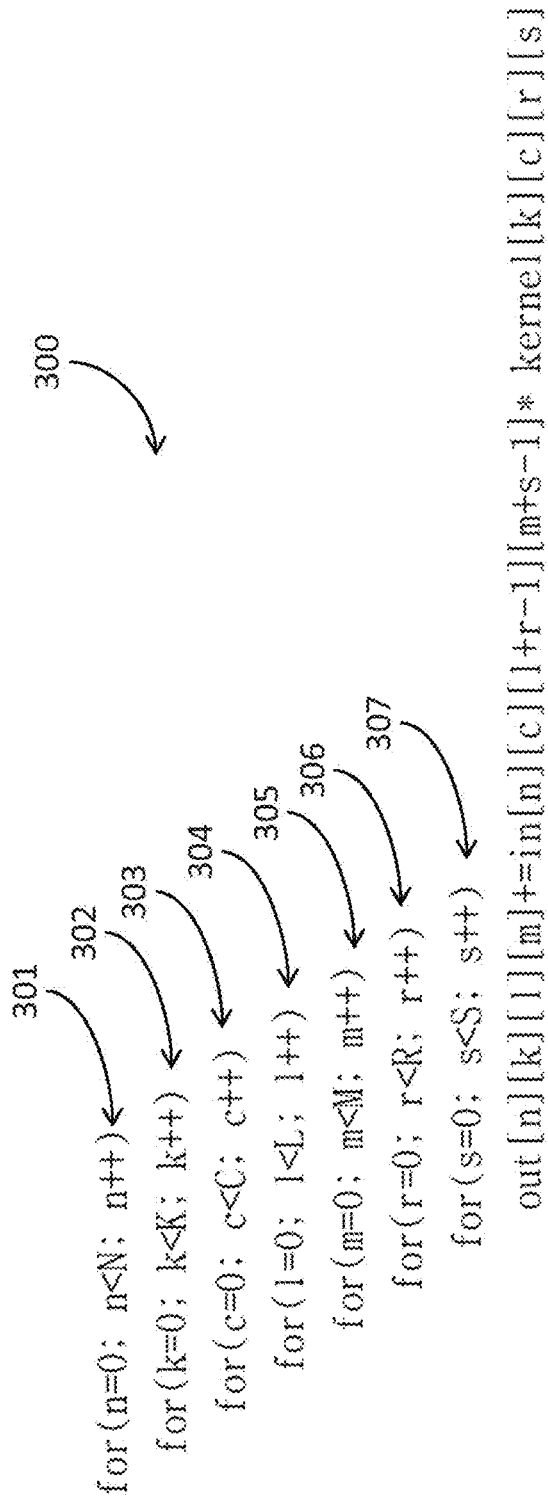
FIG. 3 is an illustration of an algorithm of a convolutional neural network according to the existing art.

In order to produce N instances of OFM 203 having dimensions K×L×M, a convolutional layer executes massive numbers of multiplications and additions with the given IFM 201 and kernels 202 within multiple nested loops. FIG. 3 is an example of pseudocode 300 showing the nested loops of a typical convolutional operation with the dimensions of data from FIG. 2. As shown, at least seven nested loops are required to iterate through the data to perform each of the dot matrix computations required for a single convolution layer of a CNN.

The first layer 301 iterates through each OFM instance (N), the second layer 302 iterates through each kernel (K), the third layer 303 iterates through each kernel plane (C), the fourth 304 layer iterates through each dimensional height value (e.g., pixel, in the case of CNN for image processing) of the OFM (L), the fifth layer 305 iterates through each dimensional width value (e.g., pixel, in the case of CNN for image processing) of the OFM (M), the sixth layer 306 iterates through each dimensional height value (e.g., pixel, in the case of CNN for image processing) of the kernel (R), and the seventh layer 307 iterates through each dimensional width value (e.g., pixel, in the case of CNN for image processing) of the kernel (S), to determine the value of the OFM at matrix coordinates [n][k][l][m] which is based incrementing the value of the OFM at the same matrix coordinates with the product of the value of the IFM at location [n][c][l+r−1][m+s−1]* and the value of the kernel at location [k][c][r][s]. Where the sizes of the IFM and kernel, and thereby the OFM, are increased to correspond to larger and higher resolution images, the number of computations to generate the OFM becomes extremely large.

It should be noted from the above discussion that each OFM value at coordinate [n][k][l][m] is accessed from and/or written to a memory R×S times before final computation of that particular OFM value is complete. Therefore, while it is desired to maintain in the internal memory as much of the IFM data and the kernel data as possible which will be used for upcoming computations, it is also advantageous to maintain as much of the output—but incomplete—OFM data (e.g., value at OFM [n][k][l][m] while r<R and s<S) until the final computation of that particular OFM value is complete. Writing the incomplete OFM data and retrieving the incomplete OFM data to complete the computations a large number of times while r<R and s<S may lead to heavy memory bandwidth use, negatively affecting computational time and power consumption.

Thus, the convolution operations in multiple nested loops as shown in FIG. 3 requires heavy data reuse due to at least the following reasons: (1) convolution reuse: each kernel element is reused L×M times; (2) input reuse: each IFM element is reused K×R×S times; (3) batch reuse: each kernel element is reused N times; and (4) incomplete OFM data reuse: each OFM coordinate value is written and accessed C×R×S times.

Ideally, if the hardware's internal memory is large enough to maintain the entire IFM data, kernel data, and OFM data available for use, the IFM data and kernel data would be loaded into the internal memory before any computations and retrieved directly from internal memory to calculate and generate the OFM data, which in turn is stored back into the internal memory until it is ready to be written to external memory. In this scenario, each element of the IFM data and kernel data are loaded into internal memory (SRAM)—from external memory (DRAM or FLASH)—only once and each element of the OFM data is stored only once, which is the ideal scenario for optimizing system throughput and computation time.

However, since internal memory is often expensive and a limited resource—particularly in lower-powered systems, the internal memory is often not large enough to hold the entire IFM data, the entire kernel data, and the entire OFM data generated from the computations. This results in increased reading and writing to and from the external memory which increases memory traffic and system throughput. As memory traffic increases, computational performance worsens and the power consumption increases, resulting in unusable implementations in lower-powered systems such as embedded systems.

Thus in a typical embedded system, a proposed solution is to partition the data to efficiently fit in the internal memory, which reduces data writing and reloading to between the external memory and the internal memory. Embodiments of the present disclosure presents a system and method for optimizing memory for convolutional neural networks by optimizing data partitioning and data replacement for the internal memory to minimize the data traffic for convolution operations.

Embodiments of the present disclosure considers three different partitioning determinations along with a selection of a memory replacement scheme among six different possible memory replacement schemes to optimize the internal memory for the convolutional layer computations of a CNN. The three different partitioning determinations include the amount and direction of partitioning (where applicable) for the IFM data, the kernel data, and the OFM data. However, since partitioning of IFM data and kernel data may be performed independently while partitioning of the OFM data is obviously dependent on the partitions of the IFM and kernel data, this discussion will focus on partitioning of the IFM data and the kernel data. The following discussion refers to partitioning of IFM data, kernel data, and OFM data, which will be understood to refer to the selection of partition sizes of each type of data to load into the internal memory prior to performing CNN computations using the loaded data, wherein the internal memory has a fixed and known total size.

The six different memory management schemes each determine different strategies and priorities for maintaining, prioritizing, or evacuating certain data in and from the internal memory among the partitioned IFM data, the kernel data, and the OFM data.

Figure 4:
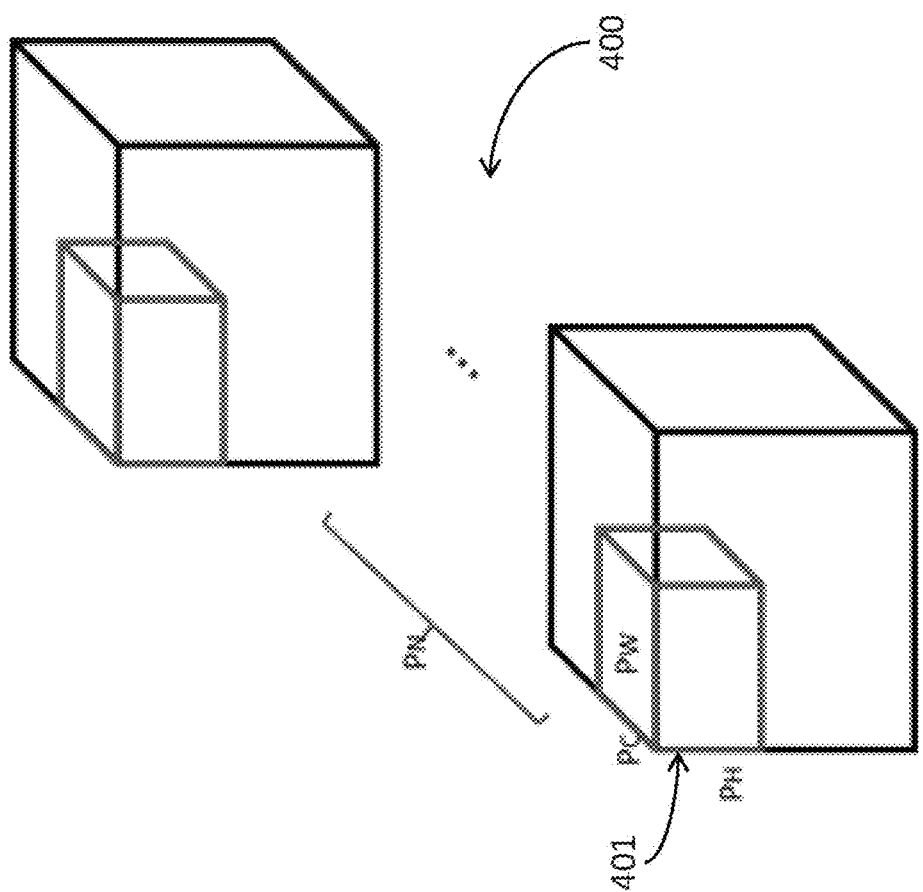
FIG. 4 is an illustration of an IFM data partition according to an embodiment of the present disclosure.

In order to fit in the internal memory for retrieval and use during CNN computations, the IFM data may be divided into multiple partitions. The IFM data consists of 4 dimensions: N×C×H×W, where N represents batch size, C represents a number of IFM channels, H represents a dimensional height of the IFM, and W represents a dimensional width of the IFM. For the purposes of this discussion, as shown in FIG. 4, the partition size 401 of the IFM data 400 will be defined as $P_N \times P_C \times P_H \times P_W$, where $P_N$ represents the IFM partition size in the IFM instance dimension, $P_C$ represents the IFM partition size in the IFM channel dimension, $P_H$ represents the IFM partition size in the height dimension, and $P_W$ represents the IFM partition size in the width dimension.

In some embodiments, unless the internal memory is large enough to hold multiple IFM data, $P_N$ is set to equal 1, such that only one IFM instance belongs to each IFM partition. It is noted that $P_H \times P_W$ defines a 2-dimensional partition of one instance of the IFM data.

Since the output OFM data is based on convolution computations of the kernel as applied to the channels of the IFM data, the IFM partition size and the number of kernels determine the OFM partition size. For example, assuming a case where $P_N=1$ (only one IFM instance) and $P_C=C$ (all channels of the IFM will be loaded into the IFM partition), with a proper stride and padding condition, the OFM partition size will be set to $1 \times 1 \times P_L \times P_M$, assuming the number of kernels is 1.

Figure 5:
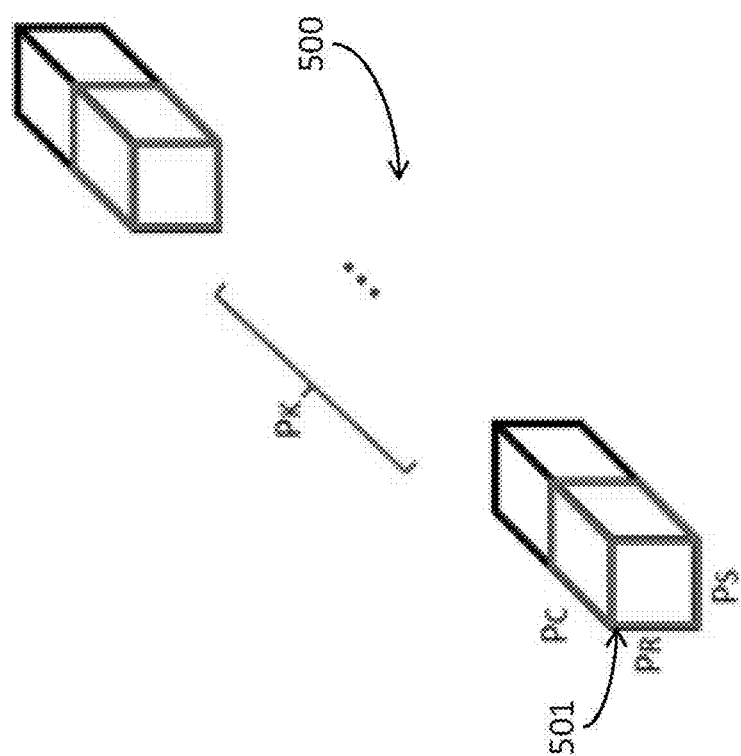
FIG. 5 is an illustration of a kernel data partition according to an embodiment of the present disclosure.

Referring to FIG. 5, kernels 500 are divided into multiple partitions 501, similarly with the IFM data. As discussed above, kernels 500 are defined with respect to 4 dimensions: K (number of kernel instances)×C (number of channels of a kernel)×R (kernel height)×S (kernel width). Accordingly, the kernel partition size 501 may be defined as $P_K \times P_{C2} \times P_R \times P_S$. In some embodiments, due to the nature of convolutional operations, $P_{C2}$ may be set to $P_C$ (each kernel partition includes all channels of the current kernel instance) to maximize computational efficiency (however portioning with $P_{C2}<C$ is available for some embodiments); and (3) to maximize computational efficiency, $P_R$ may be set to equal R, and $P_S$ may be set to equal S.

Figure 6:
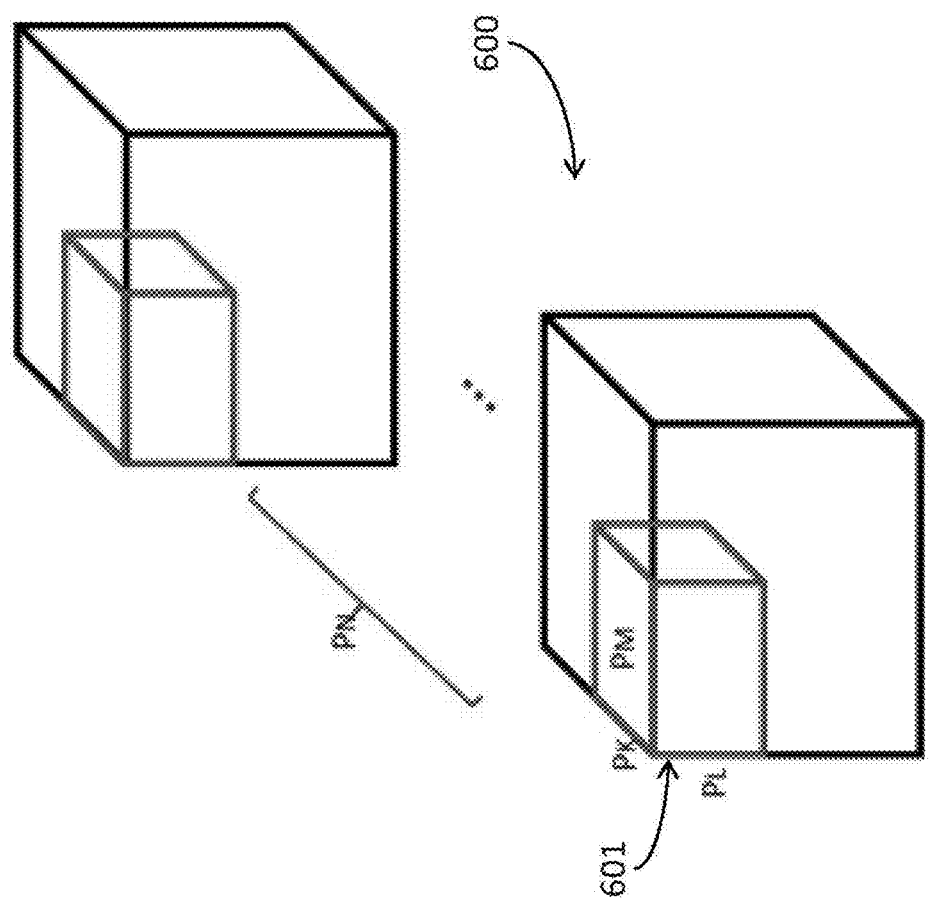
FIG. 6 is an illustration of an OFM data partition according to an embodiment of the present disclosure.

As discussed, the OFM partition size is based on the IFM partition size and the kernel partition size. Referring to FIG. 6, the OFM data 600 may be partitioned into OFM partitions 601 with size defined as $P_N \times P_K \times P_L \times P_M$, where $P_N$ represents the IFM partition size in the IFM instance dimension, and $P_K$ represents the kernel partition size in the kernel instance dimension, and height $P_L$ and width $P_M$ are dependent on the height and width dimensions of the IFM partition, the kernel partition, as well as the stride and padding for the CNN.

In order to perform convolution operations, IFM data and kernel data are loaded into the internal memory beforehand. The resulting OFM data from the convolution operations is also stored into the internal memory until it is ready to be written to external memory. To accommodate all of the data required for all of the convolutional computations, the required amount of memory is (N×C×H×W)+(K×C×R×S)+(N×K×L×M).

Based on the above, assuming that the total internal memory size is represented as D, the convolution function is represented by f( ) and the data for convolutional operations are: N, K, C, W, H, R, S, L, and M where:

$$<L,M>=f(<H,W>)$$

Data partition sizes are: $P_N$, $P_K$, $P_C$, $P_R$, $P_S$, $P_L$, $P_M$, $P_H$, $P_W$ where:

$$1<=P_N<=N,$$

$$1<=P_K<=K,$$

$$1<=P_C<=C,$$

$$1<=P_L<=L,$$

$$1<=P_M<=M,$$

$$1<=P_R<=R,$$

$$1<=P_S<=S, \text{ and}$$

$$<P_L,P_M>=f(<P_H,P_W>),$$

and the following condition must be satisfied for the internal memory:

$$(P_N \times P_C \times P_H \times P_W)+(P_K \times P_C \times P_R \times P_S)+(P_N \times P_K \times P_L \times P_M) <=D$$

Further, if the internal memory D is divided into multiple sections corresponding to the IFM data memory, kernel data memory and OFM data memory, the sizes respectively represented as $D_i$, $D_K$ and $D_O$, the following conditions must be satisfied for the internal memory:

$$(P_N \times P_C \times P_H \times P_W)<=D_i$$

$$(P_K \times P_C \times P_R \times P_S)<=D_K$$

$$(P_N \times P_K \times P_L \times P_M)<=D_O$$

$$D_i+D_K+D_O<=D$$

The optimal partition sizes are the ones that require the minimal number of memory bandwidth and maximal bus utilization to execute the nested loops of the convolution operations shown in FIG. 3.

Figure 7:
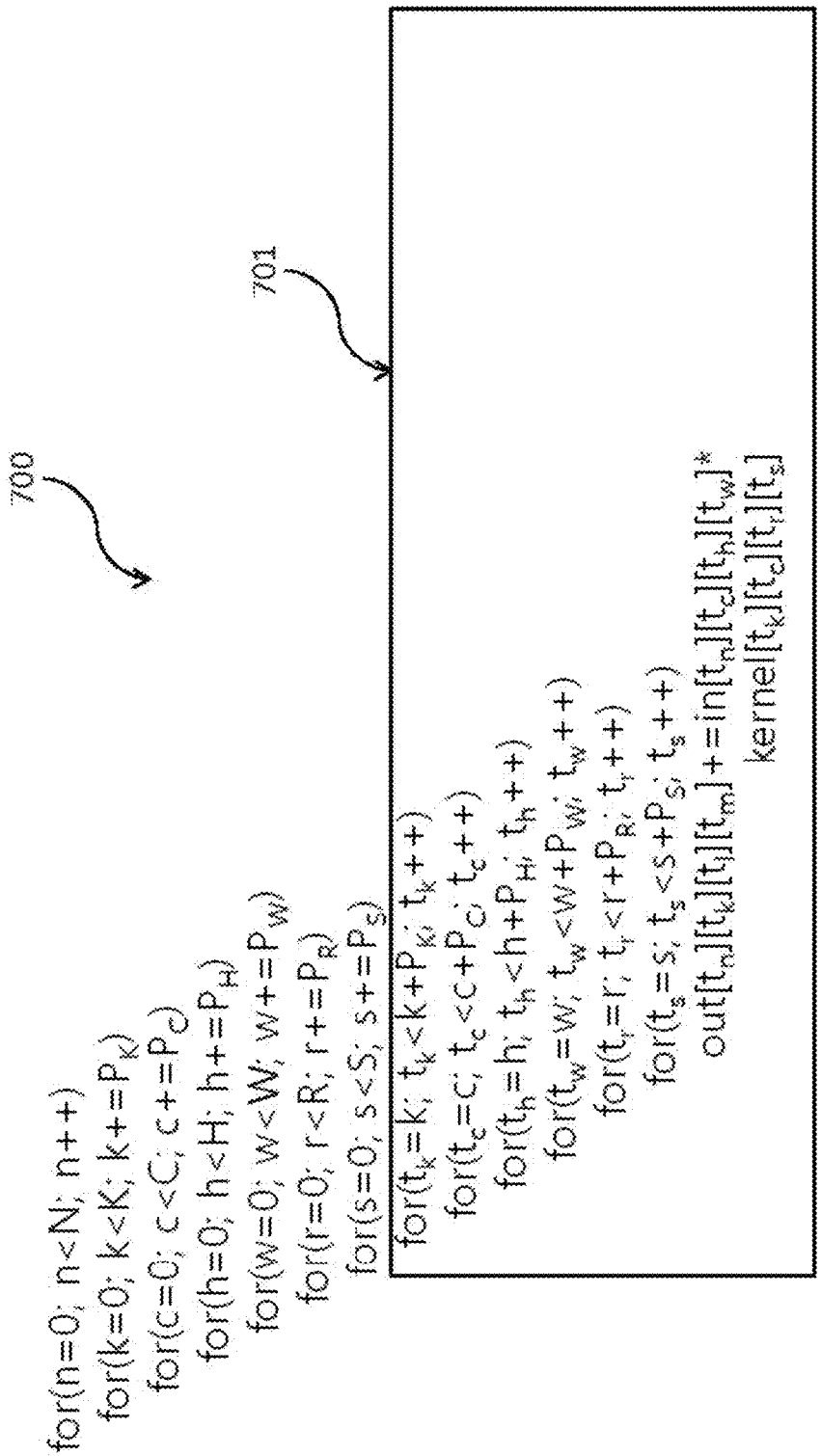
FIG. 7 is an illustration of an algorithm of a convolutional neural network according to an embodiment of the present disclosure.

Due to the partitioning of data, additional iterations are required to be added to the convolution loops 700 described in FIG. 3. Each partitioning introduces an additional unrolled loop as shown in FIG. 7. The loops indicated within 701 are unrolled to iterate through the given partition sizes, similar to the outer loops.

Based on the above, assuming that only the partitions of IFM data, kernel data, and OFM data are resident in the internal memory, the sizes of the data partitions are defined by the data partition vector $<P_N, P_K, P_C, P_H, P_W, P_R, P_S>$. The partition vector for the IFM data is $<P_N, P_C, P_H, P_W>$ and the partition vector for the kernel data is $<P_K, P_C, P_R, P_S>$.

As discussed, for computational efficiency, $P_C$ and $P_{C2}$ may be set to the same value, however in some embodiments due to constraints of partition memory, $D_i$ and $D_K$, $P_C$ and $P_{C2}$ may be set to different values. Also, $P_R$ may be set to R and $P_S$ may be set to S for computational and memory bandwidth efficiency since convolutional operations require a kernel with dimensions R×S, R and S are relatively smaller than H and W, and the kernel may be stored sequentially in the external memory making burst memory transactions more efficient. However, the present embodiment is not limited to this and various values of $P_R$ and $P_S$ are considered. Thus, in some embodiments of the present disclosure, the partition vector for kernel is $<P_K, P_C, R, S>$.

As the OFM data partition size is dependent on the IFM data partition and the kernel data partition, the partition vector for the OFM data is dependent on the partition vectors for the IFM data and the kernel data. Thus, with IFM and kernel partition vectors $<P_N, P_C, P_H, P_W>$ and $<P_K, P_C, P_R, P_S>$, respectively, the partition vector for the OFM data is $<P_N, P_K, P_L, P_M>$ where $<P_L, P_M>=f(<P_H, P_W>)$.

After a convolution operation is complete for a given set of partitioned data, some or all the data in the internal memory partitions may need to be replaced in order to perform the next series of convolutional computations.

Since the internal memory—particularly in lower-powered and embedded systems—may be small, the internal memory may not be large enough to maintain all three partitioned data (IFM, kernel, OFM) until all computations requiring the three partitioned data are completed. Thus, one or more of the partitioned data that is stored in the internal memory may be required to be evacuated and replaced with newly fetched partitioned data to be used for the next set of convolution computations.

The evacuated data may be re-fetched and re-loaded into the internal memory when it is required again, based on the iterative loops as discussed in FIG. 7. Since each type of data is used at different times and for a different total number of times, determining which type of data to maintain and which type of data to evacuate and reload may have a direct impact on system performance and power consumption due to data bandwidth usage between internal and external memories and system throughput.

Before a next partitioned data is loaded into the internal memory to replace a currently loaded partitioned data, the next partition of data should be selected from the data volumes stored in the external memory. Since each data volume is 4-dimensional, the next partition of data may be offset from the currently loaded partitioned data in any dimensional direction of the data volume. In the case of IFM data, the IFM data has an N-direction, C-direction, H-direction and W-direction, as discussed above, and this similarly applies for the kernel data and the OFM data. However, certain dimensional directions may be designated over others to optimize the partitioning approach. This is discussed below with respect to FIG. 8.

For the IFM data 800, moving in either the H-direction 801 or the W-direction 802 in the planar space to select a next partition of IFM data may have the same effect on the next convolution computation. Additionally, embodiments may be implemented such that a whole 3-D volume of the IFM (or kernel, or OFM) instance is processed before moving to a next instance in the N-direction. Thus, partitioning the IFM data in the W-direction 802 (width-direction, same effect as H-, or height-direction) and in the C-direction 803 (depth direction) are explicitly included in this disclosure. However, it will be understood by those of ordinary skill that partitioning the data in any of the 4 dimensional directions is possible and considered in this disclosure, and may be applied to any embodiment of the present disclosure, if appropriate.

Figure 8:
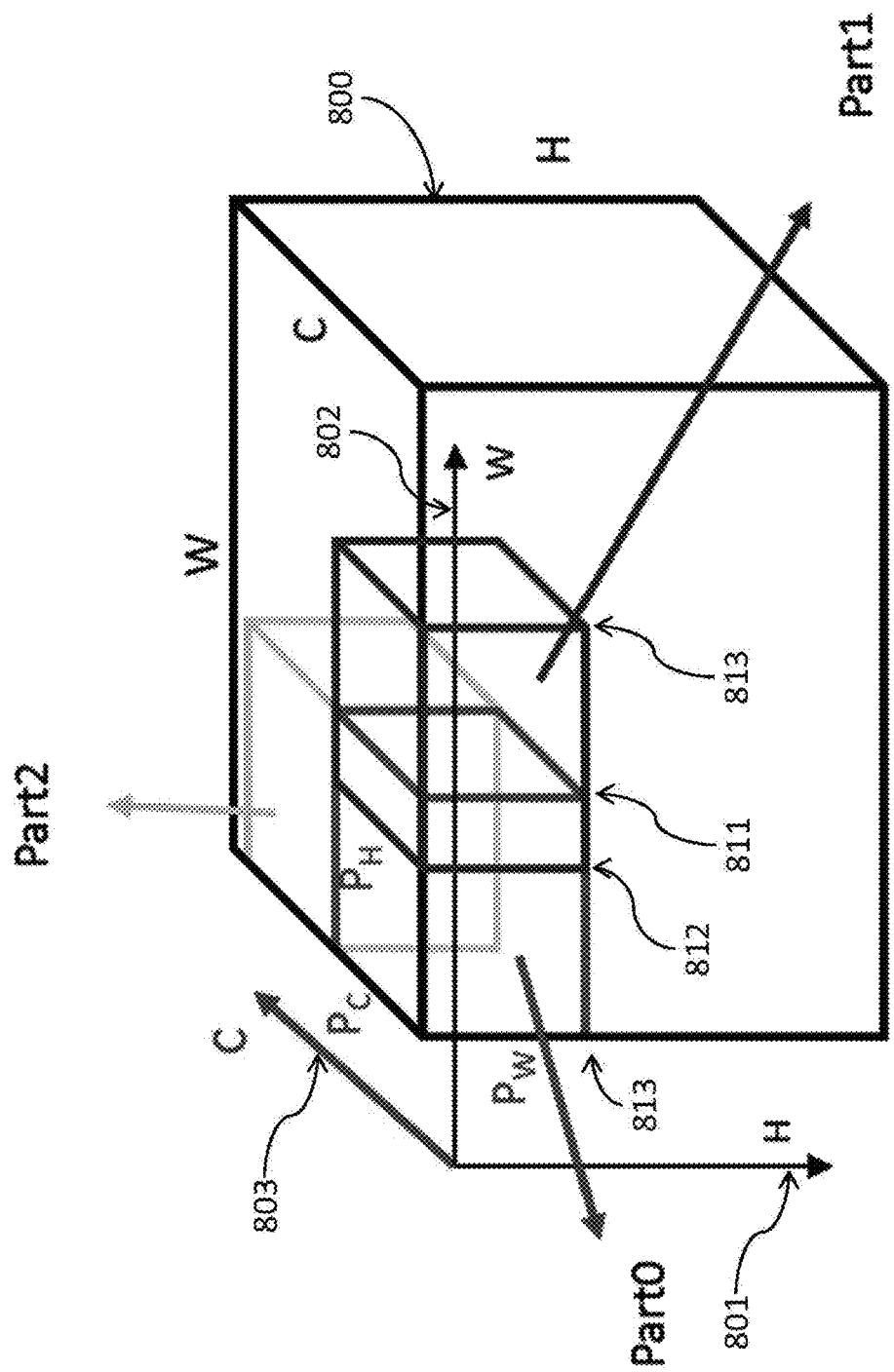
FIG. 8 is an illustration of an IFM data partition according to an embodiment of the present disclosure.

FIG. 8 shows an example of partitioning the IFM volume 800 according to embodiments of the present disclosure. Assuming the current IFM data partition, indicated as partition Part0 (defined in the W-direction by 810, 811), the next partition in the width-direction may be selected as partition Part1 (defined in the W-direction by 812, 813), while the next partition in the depth-direction is indicated as partition Part2.

Note that all computations using an OFM data partition is completed only after the computations of a full kernel instance having dimensions C×R×S is accumulated over a given IFM data partition with dimensions $C \times P_H \times P_W$ (all channels of the given IFM data partition).

Thus, after the computations using the IFM partition Part0 are completed, if the depth-direction is taken to select IFM partition Part2, a completed OFM volume of size $<1, P_K, P_L, P_M>$ may be output to the internal memory, and then output to the external memory since that portion of the OFM data is fully computed.

However, if width-direction is taken to select IFM partition Part1, only a partial sum of the OFM volume $<1, P_K, P_L,$ $P_M>$ is formed, and this partial sum needs to then be maintained in the internal memory until the remainder of the computations for the OFM volume are completed. It is noted that partition Part1 may overlap with partition Part0 due to the kernel size and the stride size of convolutional computations. Thus, the kernel size and the stride size will determine the amount of overlap between Part0 and Part1, determining the amount of same IFM data which will be loaded into the internal memory. The overlap will happen in the IFM height direction.

The above example provides reasoning for particular advantages of partitioning the IFM, kernel, or OFM data in a particular direction within the volumes stored in the external memory. These considerations will be discussed further below with respect to the various replacement policies, some which may dictate the direction of partition as discussed above.

In the following discussion, the details of determining optimum partitions of the CNN data and memory replacement policies for optimizing the convolutional computations of the CNN are presented.

The setting which determines which type of data (IFM, kernel, OFM) from the internal memory is to be evacuated and which type of data (IFM, kernel, OFM) is to be newly fetched from the external memories to replace the evacuated data is referred to as a replacement policy or replacement scheme. It will be understood that data that is maintained in the internal memory is determined to be required for additional convolutional operations in the CNN. When the data in the internal memory is no longer referenced, when it is finally written data, or due to the lack of memory the data needs to be evacuated even if it is to be referenced in the future, the data will be evacuated, written to external memory, and replaced with newly fetched data, regardless of the type of data and regardless of the replacement policy.

In embodiments of the present disclosure, a replacement policy is provided to the system to designate which type of data (IFM, kernel, OFM) to maintain in the internal memory while the other types of data are evacuated and fetched as needed. In some embodiments, the replacement policy may designate one type of data to maintain in the internal memory while the other two types of data are freely evaluated and re-loaded as needed. Thus embodiments of the present disclosure may include 3 different replacement policies depending on which data is maintained in the internal memory: IFM stationary, kernel stationary and OFM stationary, where:

IFM stationary: Once a partition of IFM data is loaded in the internal memory from the external memory, it remains in the IFM memory partition of the internal memory until all of the convolution computations requiring the partitioned IFM data are complete. After all convolution computations using the partitioned IFM data are complete, another partition of IFM data is loaded.

Kernel stationary: Once a partition of kernel data is loaded in the internal memory from the external memory, it remains in the kernel memory partition until all of the convolution computations requiring the partitioned kernel data are complete. After all convolution computations using the partitioned kernel data are complete, another partition of kernel data is loaded.

OFM stationary: Once a partition of OFM data is loaded in the internal memory from the external memory, it remains in the OFM memory partition until all of the convolution computations related to the partitioned OFM data are complete. After all convolution computations using the partitioned OFM data are complete, another partition of OFM data is loaded.

In some embodiments, each replacement policy may also designate a second-highest priority type of data to prioritize over the third type of data when managing the data in the internal memory. While the type of data selected to be stationary in the internal memory is not affected, the second-highest priority type of data may be prioritized over the remaining third type of data for data reuse in additional convolution operations.

Thus, the above three different replacement policies may be further divided into six total different replacement policies:

IFM stationary with kernel priority (IFM_KNL): While the partitioned IFM data is stationary in the internal memory, the partitioned kernel data has higher priority in data reuse over the partitioned OFM data.

IFM stationary with OFM priority (IFM_OFM): While the partitioned IFM data is stationary in the internal memory, the partitioned OFM data has higher priority in data reuse over the partitioned kernel data.

Kernel stationary with IFM priority (KNL_IFM): While the partitioned kernel data is stationary in the internal memory, the partitioned IFM data has higher priority in data reuse over the partitioned OFM data.

Kernel stationary with OFM priority (KNL_OFM): While the partitioned kernel data is stationary in the internal memory, the partitioned OFM data has higher priority in data reuse over the partitioned IFM data.

OFM stationary with IFM priority (OFM_IFM): While the partitioned OFM data is stationary in the internal memory, the partitioned IFM data has higher priority in data reuse over the partitioned kernel data.

OFM stationary with kernel priority (OFM_KNL): While the partitioned OFM data is stationary in the internal memory, the partitioned kernel data has higher priority in data reuse over the partitioned IFM data.

Based on the above, embodiments of the present disclosure include computing a computation cost of the computations involved in a convolutional layer of a CNN given a particular input for each of the replacement policies in combination with all possible combinations of an IFM data partition size, a kernel data partition size, and an OFM data partition size. The embodiments further include using a search method for finding the combination of the replacement policy and sizes of the IFM data partition, kernel data partition, and OFM data partition that has the lowest computation cost for the convolutional layer.

It must be considered that various CNNs may have very different dimension sizes. For example, a CNN may have inputs ranging from 1 channel to 1000 channels, from 28×28 elements (pixels) for the MNIST (Modified National Institute of Standards and Technology database) database, to 4096×2048 elements (pixels) for UHD images. Even within a CNN, the dimension sizes may change dramatically between its layers. Thus, embodiments of the present disclosure include identifying the optimum combination of data partitions and replacement policies for each convolutional layer of a CNN. A computation cost for each convolutional layer may be determined based on use of memory bandwidth, system throughput, calculation cost, resource usage, and the like, or combinations thereof, for each combination of data partition sizes and replacement policy given the same particular input to the layer.

An embodiment of the present disclosure thus utilizes an exhaustive search method to compute the computation cost for each combination of data partition sizes and replacement policy, and to identify the optimum combination for each particular convolutional layer of the CNN. In other embodiments, other optimization search methods and techniques known to those or ordinary skill may be utilized, including various embodiments utilizing local and global optimization, liner relaxation, constraint generation, constraint propagation, steepest descent, stochastic optimization, simulated annealing, and the like.

In embodiments of the present disclosure, configuring a low-powered or embedded system to utilize a CNN to perform a particular task, such as image recognition, may include implementing a CNN configured to use the replacement policy and the sizes of the IFM, kernel, and OFM partitions which are determined to result in the lowest computation cost.

FIG. 9 shows an example of an algorithm 900 according to an embodiment of the present disclosure represented by pseudo code, wherein operations of the algorithm include determining a combination of a replacement policy from the six possible policies (IFM_OFM, IFM_KNL, KNL_IFM, KNL_OFM, OFM_IFM, OFM_KNL) and for each policy, determining a set of partition sizes, using the function find_partition( ), which results in a lowest computation cost for the layer in combination with the replacement policy being evaluated. The data partitioning algorithm takes as input the size of the convolution to be input to the layer, and sizes of the partitions in the internal memory corresponding to the IFM data, kernel data, and the OFM data.

FIG. 10 shows an example of an algorithm 1000 represented by pseudo code according to an embodiment of the present disclosure for the find_partition( ) function which is configured to find the partition sizes for the IFM data and kernel data with the minimal computation cost given the particular replacement policy. In the embodiment shown, the OFM data partition size is determined based on the IFM and kernel partition sizes, however in other embodiments the algorithm 1000 may include additional operations to determine the OFM data partition size.

The find_partition( ) function shown in algorithm 1000 takes as input the convolution input dimensions, the sizes of the partitions of the internal memory corresponding to the IFM, kernel, and OFM, and the replacement policy currently being evaluated. The output of the find_partition( ) function of FIG. 10 includes the optimum partition sizes of the IFM data and kernel data, and the corresponding cost which is identified as the lowest cost, determined using the calculate_cost( ) function. With each partition in $<P_H, P_W>$, the values of $P_C$ and $P_K$ are calculated with the constraints of:

$$P_C * P_H * P_W <= D_I \tag{1}$$

$$P_K * P_C * R * S <= D_K \tag{2}$$

With OFM stationary, $P_K * P_H * P_W <= D_O \tag{3}$

Referring now to FIG. 11, an example of an algorithm 1100 represented by pseudo code according to an embodiment of the present disclosure for the calculate_cost( ) function. The function calculates the computation cost based on memory bandwidth and the system throughput. The optimum input partition vector is the one with the minimal data bandwidth. In some embodiments, data bandwidth may be calculated based on the following, where data bandwidth is equal to:

(number of *IFM* partitions×*IFM* partition size×number of *IFM* reloading)+(number of kernel partitions×kernel partition size×number of kernel reloading)+(number of *OFM* partitions×*OFM* partition size×number of *OFM* reloading)

The calculate_cost( ) function takes as input data partition sizes, the convolution input dimensions, and a replacement policy. It calculates the cost of a layer of computations on the convolutional input given the combination of the partition sizes and the replacement policy.

Thus, embodiments of the present disclosure include identifying the optimum combination of data partitions and replacement policies for each convolutional layer of a CNN using the functions and algorithms discussed above. In some embodiments, certain constraints may be placed on one or more of the above algorithms to reduce computation time and eliminate unlikely values. For example, minimum or maximum values of the data partition sizes may be input to the functions. In other embodiments, the functions may be modified to include minimum or maximum values of the partition sizes based on each particular type of replacement policy, or the functions may be modified to receive these values as inputs.

As discussed, in some embodiments, after the cost is calculated for all combinations, a search method, such as an exhaustive search in one example, may be used to identify the partition sizes and replacement policy having a lowest computation cost for that particular layer. It will be understood by those of ordinary skill that various other approaches and techniques for partitioning the data, calculating the cost, and identifying the lowest cost combination of partition sizes and replacement policy are possible, and are considered by this disclosure.

Since the IFM, kernel, and OFM data are to be partitioned in the internal memory such that the entirety of each type of data is not readily available for the convolution computations of a given layer, the convolution loops discussed in FIG. 7 require further modification. Since iterating through the data partitions may now be varied based on the replacement policy that is selected for optimization, the modifications to the loops of FIG. 7 may be different for each case, as discussed below.

For example, FIG. 12 shows pseudo code representing an example of the updated convolution loops 1200 for the IFM data stationary with kernel priority (IFM_KNL) replacement policy according to an embodiment of the present disclosure. In this replacement policy, reuse of the kernel data has higher priority over reuse of the OFM data so the loop through channel C (referred to as the C loop) is executed outside of the loop through width W (referred to as the W loop, where the loop through height H is referred to as the H loop).

Each IFM partition is loaded only once and reused through all K kernels. Once the function load_input( ) loads an IFM partition, all K kernels are executed through $P_K$ kernel partitions (referred to as the K loop). This ensures that an IFM partition is loaded only once throughout the entire execution of the CNN layer. Each kernel partition may be reloaded if ($P_H$<H or $P_W$<W) since load_kernel( ) is inside of the H loop and the W loop. Each OFM partition also can be reloaded if it does not fit into the internal memory partition for the OFM data, $D_O$ (e.g., if $P_K*P_L*P_M>D_O$).

The number of reloading times of the IFM data, kernel data, and OFM data in the partition scheme are calculated using the following formulas:

$$\text{reload}_{IFM} = 1$$

$$\text{reload}_{kernel} = \text{ceiling}\left(\frac{H}{P_H}\right) * \text{ceil}\left(\frac{W}{P_W}\right)$$

-continued $$\text{reload}_{OFM} = (P_K * P_L * P_M < D_O) \; ?1: \text{ceil}\left(\frac{C}{P_C}\right)$$

Referring now to FIG. 13, pseudo code representing an example of the updated convolution loops 1300 for the IFM data stationary with OFM priority (IFM_OFM) replacement policy according to an embodiment of the present disclosure is shown. This replacement policy is similar to the IFM stationary with kernel priority replacement policy shown in FIG. 12 in that the IFM data and kernel data are partitioned. The difference is that the partitions are chosen in the depth-direction first in order to complete the OFM outputs as quickly as possible since the OFM data will be prioritized over the kernel data. The C loop is inside of H and W loops to maintain the OFM priority. The number of reloading times of the IFM data ($\text{reload}_{IFM}$), kernel data ($\text{reload}_{kernel}$), and OFM data ($\text{reload}_{OFM}$) in the partition scheme are calculated using the formulas provided above with respect to FIG. 12.

Referring now to FIG. 14, pseudo code representing an example of the updated convolution loops 1400 for the kernel data stationary with IFM priority (KNL_IFM) replacement policy according to an embodiment of the present disclosure is shown. In this replacement policy, each kernel data partition <$P_K$, $P_C$, R, S> is loaded only once and reused through all IFM data partitions <1, $P_C$, $P_H$, $P_W$>. In some embodiments, in order to minimize the number of times the IFM data is reloaded in the internal memory, $P_K$ may be set to a larger value, while $P_C$ is set to a smaller value. Once a kernel data partition is loaded, IFM data partitions are loaded in the width-direction. Accordingly, the H loop and W loop are inside the C loop and the K loop to ensure that the kernel data partition is reused over the entire IFM data partition, e.g., the $P_C \times H \times W$ volume, before replacing the kernel data partition. The number of reloading times of the IFM data, kernel data, and OFM data in the partition scheme are calculated using the following formulas:

$$\text{reload}_{IFM} = \text{ceil}\left(\frac{K}{P_K}\right)$$

$$\text{reload}_{kernel} = 1$$

$$\text{reload}_{OFM} = (P_K * P_L * P_M < D_O) \; ?1: \text{ceil}\left(\frac{C}{P_C}\right)$$

Referring now to FIG. 15, pseudo code representing an example of the updated convolution loops 1500 for the kernel data stationary with OFM priority (KNL_OFM) replacement policy according to an embodiment of the present disclosure is shown. This replacement policy is similar to the kernel stationary with IFM priority (KNL_IFM) discussed above in that a kernel partition is loaded only once. The difference is that the IFM partitions are chosen in the deep-direction first in order to complete the OFM outputs as quickly as possible since the OFM data will be prioritized over the IFM data. Accordingly, the C loop is inside the H loop and the W loop to maintain the OFM priority. The number of reloading times of the IFM data ($\text{reload}_{IFM}$), kernel data ($\text{reload}_{kernel}$), and OFM data ($\text{reload}_{OFM}$) in the partition scheme are calculated using the formulas provided above with respect to FIG. 14.

Referring now to FIG. 16, pseudo code representing an example of the updated convolution loops 1600 for the OFM data stationary with IFM priority (OFM_IFM) replacement policy according to an embodiment of the present disclosure is shown. In this replacement policy, once a completed OFM data partition is formed, it is evacuated from internal memory and stored to the external memory after all convolution operations for the partition is completed. This requires computation of all channels C (e.g., completion of the C loop) of the IFM data partition and the kernel data partition. Thus, the OFM data partition vector <1, $P_K$, $P_L$, $P_M$> should fit inside the internal memory partition for OFM data, $D_O$. As previously similarly discussed, in order to maintain the OFM data stationary in the internal memory (until all computations using that OFM data partition are completed), the partition for the convolution loop proceeds in the depth-direction first when partitioning the IFM data. The number of reloading times of the IFM data, kernel data, and OFM data in the partition scheme are calculated using the following formulas:

$$reload_{IFM} = ceil\left(\frac{K}{P_K}\right)$$

$$reload_{kernel} = ceil\left(\frac{H}{P_H}\right) * ceil\left(\frac{W}{P_W}\right)$$

$$reload_{OFM} = 1$$

Referring now to FIG. 17, pseudo code representing an example of the updated convolution loops 1700 for the OFM data stationary with kernel data priority (OFM_KNL) replacement policy according to an embodiment of the present disclosure is shown. This replacement policy is similar to the replacement policy for kernel stationary with OFM priority (KNL_OFM), when Pc=C. The loop order may be the same as the loop order for the KNL_OFM replacement policy (shown in FIG. 16). However, the convolution loops for OFM_KNL (FIG. 18) may differ from KNL_OFM (FIG. 16) in that the OFM data may be stored only once within the loops iterating through the partitions (indicated by the box in FIG. 18). The number of reloading times of the IFM data, kernel data, and OFM data in the partition scheme are calculated using the following formulas:

$$reload_{in} = ceil\left(\frac{K}{P_K}\right)$$

$$reload_{kernel} = 1$$

$$reload_{ofm} = 1$$

Figure 18:
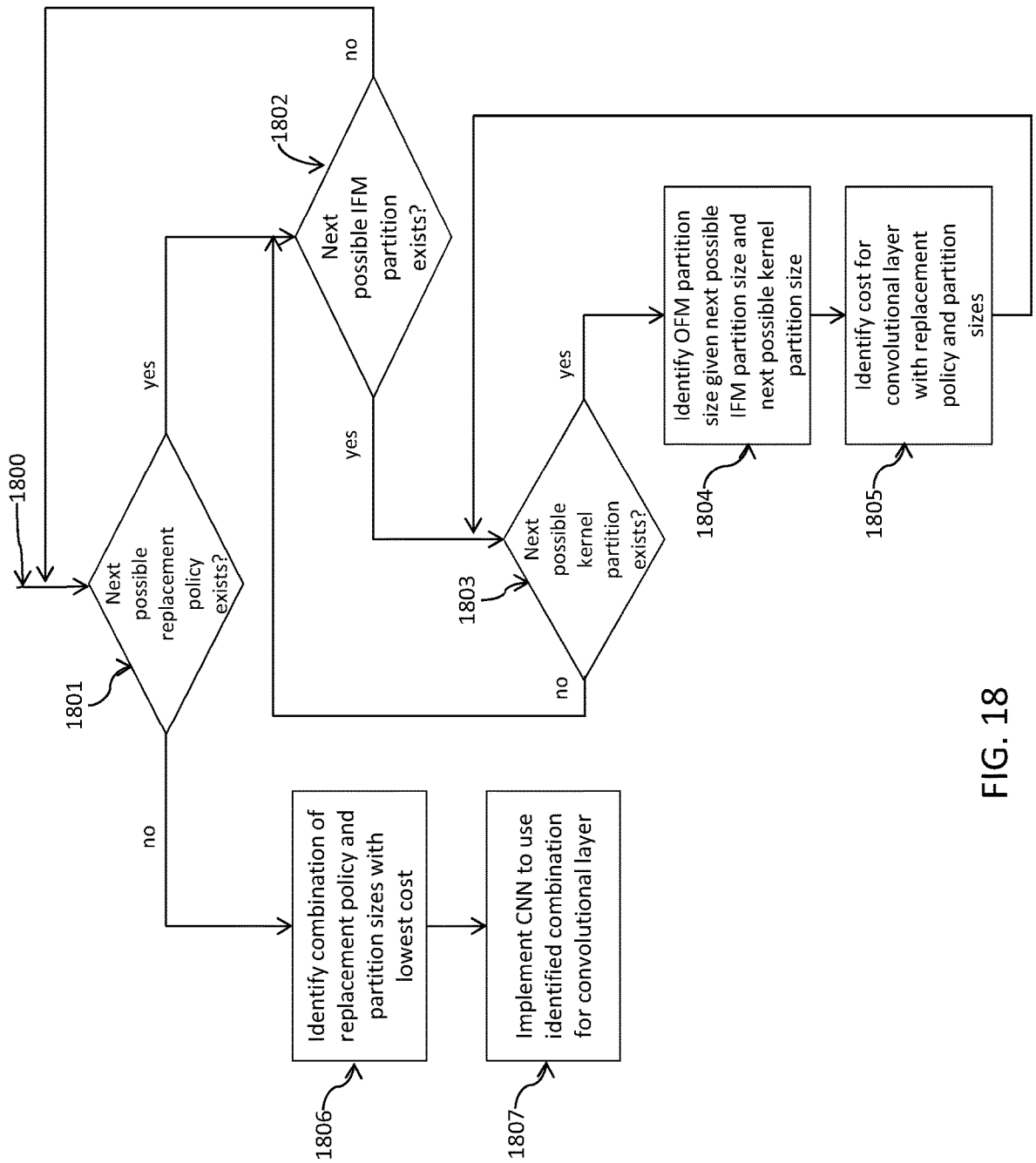
FIG. 18 is a flowchart illustration of a method according to an embodiment of the present disclosure.

Referring now to FIG. 18, a flowchart showing an example of a method of the present disclosure is shown. Starting at 1800, a first replacement policy of the various replacement policies discussed above may be selected 1801 for evaluation with respect to a convolutional layer of a CNN given a particular IFM, kernel, OFM and internal memory size. Next, at 1802, possible partition sizes of the IFM data may be iterated, and a particular IFM partition size may be selected. Next, at 1803, possible partition sizes of the kernel data may be iterated, and a particular kernel partition size may be selected.

It is noted that if there are no further possible kernel partition sizes at 1803, the process returns to select a next possible IFM partition size at 1802. Similarly, if there are no further possible IFM partition sizes at 1802, the process returns to select a next possible replacement policy for evaluation at 1801. Although the embodiment considers possible IFM partition sizes at 1802 and then possible kernel partition sizes at 1803 for each possible IFM partition size, it will be understood that the disclosure is not limited thereto and the relative positioning of 1802, 1803, may be switched or changed.

Once a possible IFM partition size and a kernel partition size is selected for consideration, the method may include identifying the OFM partition size given the selected IFM and kernel partition sizes, 1804. As discussed, the OFM partition size may based on the IFM partition size. However, in some embodiments, the method may further include confirming that the OFM partition size at 1804 does not exceed a size of the OFM memory partition of the internal memory (not depicted). In such embodiments, if the selected OFM partition size exceeds the OFM memory partition of the internal memory, the method may skip the selected IFM partition size and return to 1802 to select a next possible IFM partition size.

Once IFM, kernel, and OFM partition sizes are selected for consideration, the method may further include performing the computations of the convolutional layer of the CNN using the partition sizes and the currently considered memory replacement policy (selected at 1801). Once all computations are completed, a computation cost for the layer using the combination of partition sizes and the selected replacement policy identified at 1805.

After the cost for the particular combination is identified, the method may return to 1803 to select a next possible kernel partition size given the currently selected IFM partition size, with all subsequent operations (1803, 1804, 1805) repeated in order to identify the computation cost for all possible kernel and OFM partition sizes given the selected IFM partition size. After no additional possible kernel sizes exist 1803 for the selected IFM partition size, the method may return to 1802 to select a next possible IFM partition size, with all subsequent operations repeated in order to identify the computation cost for all possible IFM, kernel, and OFM partition sizes given the selected replacement policy identified at 1805.

Once all possible replacement policies (and corresponding all possible IFM, kernel, and OFM partition sizes) have been evaluated 1801 to identify the computation cost for each combination, the method may proceed to operation 1802 to identify the optimal combination of a particular replacement policy with the IFM, kernel, and OFM partition sizes which results in the lowest computation cost for the convolutional layer calculations, at 1806. This optimal combination may be identified by performing an exhaustive search through all combinations and associated computation costs identified in the operations 1800-1805. As discussed, some embodiments may utilize other search methods, including various embodiments utilizing local and global optimization, liner relaxation, constraint generation, constraint propagation, steepest descent, stochastic optimization, simulated annealing, and the like.

Next, the method may further include implementing the CNN 1807 to use the identified optimal combination of the particular replacement policy with the IFM, kernel, and OFM partition sizes for calculation of the convolutional layer when the CNN is executed using an input.

Figure 19:
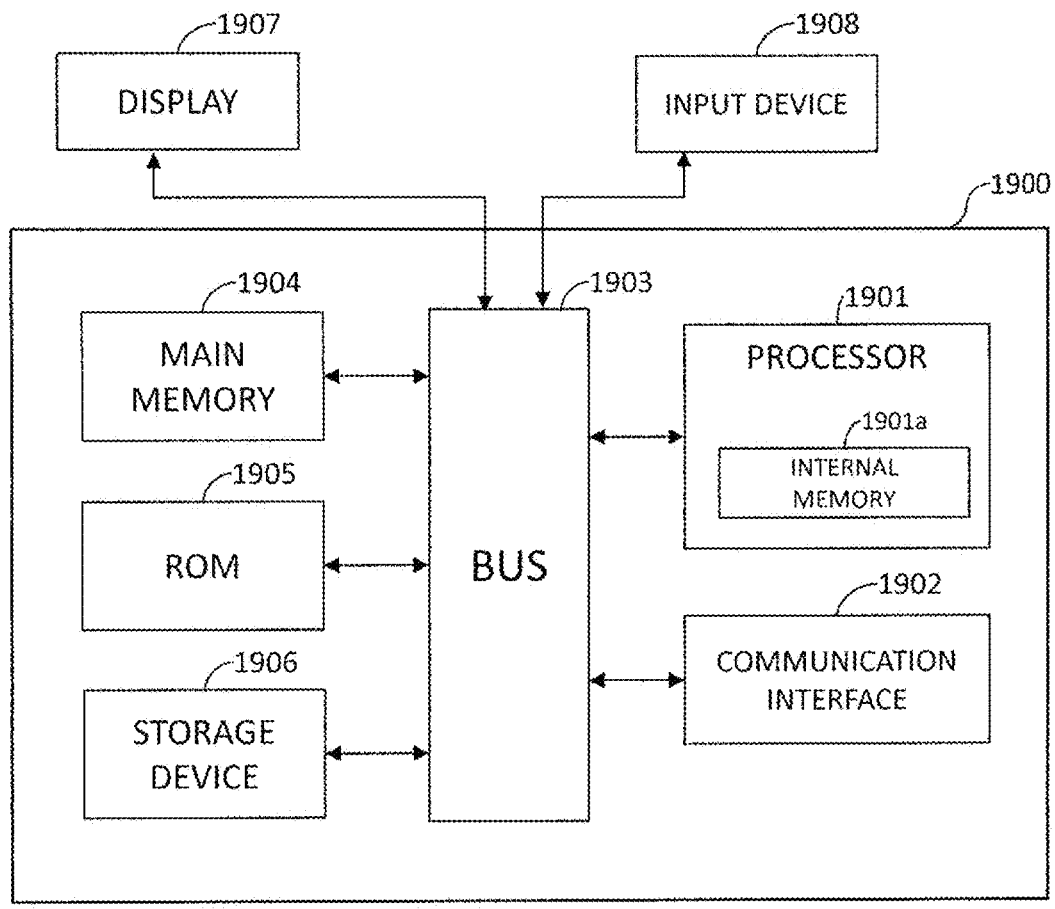
FIG. 19 is a diagram of an apparatus implemented according to an embodiment of the present disclosure.

Referring now to FIG. 19, an illustration of an example computer 1900 is provided which may be used to embody, implement, execute, or perform embodiments of the present disclosure. In selected embodiments, the computer 1900 may include a bus 1903 (or multiple buses) or other communication mechanism, a processor 1901, processor internal memory 1901*a*, main memory 1904, read only memory (ROM) 1905, one or more additional storage devices 1906, and/or a communication interface 1902, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 1903 or other communication mechanism, including multiple such buses or mechanisms, may support communication of information within the computer 1900. The processor 1901 may be connected to the bus 1903 and process information. In selected embodiments, the processor 1901 may be a specialized or dedicated microprocessor configured to perform particular tasks in accordance with the features and aspects disclosed herein by executing machine-readable software code defining the particular tasks. Main memory 1904 (e.g., random access memory—or RAM—or other dynamic storage device) may be connected to the bus 1903 and store information and instructions to be executed by the processor 1901. Processor 1901 may also include internal memory 1901*a*, such as CPU cache implemented by SRAM, for storing data used for executing instructions. Utilization of internal memory 1901*a* may optimize data and memory management by reducing memory bandwidth usage with main memory 1904. Although FIG. 19 depicts internal memory 1901*a* as a component of processor 1901, it will be understood that embodiments are included wherein internal memory 1901*a* is a separate component apart from processor 1091. Main memory 1904 may also store temporary variables or other intermediate information during execution of such instructions.

ROM 1905 or some other static storage device may be connected to a bus 1903 and store static information and instructions for the processor 1901. An additional storage device 1906 (e.g., a magnetic disk, optical disk, memory card, or the like) may be connected to the bus 1903. The main memory 1904, ROM 1905, and the additional storage device 1906 may include a non-transitory computer-readable medium holding information, instructions, or some combination thereof, for example instructions that when executed by the processor 1901, cause the computer 1900 to perform one or more operations of a method as described herein. A communication interface 1902 may also be connected to the bus 1903. A communication interface 1902 may provide or support two-way data communication between a computer 1900 and one or more external devices (e.g., other devices contained within the computing environment).

In selected embodiments, the computer 1900 may be connected (e.g., via a bus) to a display 1907. The display 1907 may use any suitable mechanism to communicate information to a user of a computer 1900. For example, the display 1907 may include or utilize a liquid crystal display (LCD), light emitting diode (LED) display, projector, or other display device to present information to a user of the computer 1900 in a visual display. One or more input devices 1908 (e.g., an alphanumeric keyboard, mouse, microphone, stylus pen) may be connected to the bus 1903 to communicate information and commands to the computer 1900. In selected embodiments, one input device 1908 may provide or support control over the positioning of a cursor to allow for selection and execution of various objects, files, programs, and the like provided by the computer 1900 and displayed by the display 1907.

The computer 1900 may be used to transmit, receive, decode, display, or the like one or more video files. In selected embodiments, such transmitting, receiving, decoding, and displaying may be in response to the processor 1901 executing one or more sequences of one or more instructions contained in main memory 1904. Such instructions may be read into main memory 1904 from another non-transitory computer-readable medium (e.g., a storage device).

Execution of sequences of instructions contained in main memory 1904 may cause the processor 1901 to perform one or more of the procedures or steps described herein. In selected embodiments, one or more processors in a multi-processing arrangement may also be employed to execute sequences of instructions contained in main memory 1904. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 1901, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 1902 may provide or support external, two-way data communication to or via a network link. For example, a communication interface 1902 may be a wireless network interface controller or a cellular radio providing a data communication network connection. Alternatively, a communication interface 1902 may comprise a local area network (LAN) card providing a data communication connection to a compatible LAN. In any such embodiment, a communication interface 1902 may send and receive electrical, electromagnetic, or optical signals conveying information.

A network link may provide data communication through one or more networks to other data devices (e.g., other computers such as 1900, or terminals of various other types). For example, a network link may provide a connection through a local network of a host computer or to data equipment operated by an Internet Service Provider (ISP). An ISP may, in turn, provide data communication services through the Internet. Accordingly, a computer 1900 may send and receive commands, data, or combinations thereof, including program code, through one or more networks, a network link, and communication interface 1902. Thus, the computer 1900 may interface or otherwise communicate with a remote server, or some combination thereof.

As an example experiment to determine the effects of the present disclosure, a CNN was implemented using the partitioning and replacement policy according to the present disclosure and compared against a fixed partitioning and replacement policy.

As an example, one of the the fixed policies included the following properties:

IFM partitioning policy: If the entire IFM and kernels can be loaded into the internal memory, the entire IFM and kernels will be loaded; if the whole IFM cannot be load into the internal memory, the IFM partitioning is fixed to <1, 1, PH, P W> where PH*PW<Di.

Kernel partitioning policy: If the entire kernels cannot be loaded into $D_K$, its partitioning is fixed to <1, 1, R, S>. The replacement policy was set to IFM stationary and kernel priority.

A hardware CNN accelerator was designed as a field-programmable gate array (FPGA) with the internal memory for the experiments. Table 1 below shows the hardware configuration used:

TABLE 1

| CNN hardware accelerator configuration. | |
|---|---|
| Frequency | 24 Mh |
| Number of Multipliers | 256 |
| Internal Memory Size | 24 KB |
| Max External Memory Bandwidth (DDR) | 10.6 GB/sec |

Figure 20:
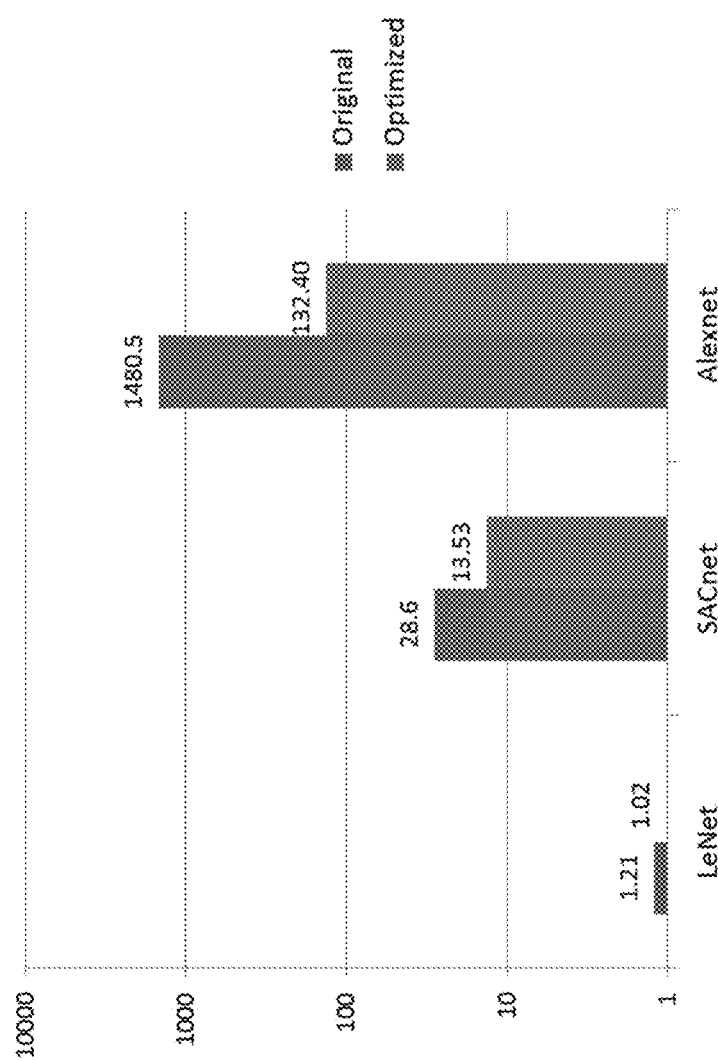
FIGS. 20 and 21 are diagrams showing experimentation results of implementations using the embodiments of the present disclosure.

Three CNNs were chosen for the experiments: LeNet, proprietary SACnet, and AlexNet. All of these are targeted for classification. FIG. 20 shows the total external memory bandwidth for IFM, kernels and OFM per image frame comparing the implementation of the original and the optimized policies.

Since LeNet is a very small CNN with small amount of data, the bandwidth reduction over the original policy was not significant. Note that LeNet uses the input image size of 1×28×28. Most of the time, when IFM, kernels and OFM fit in the internal memory of the FPGA system, the partitioning and replacement policy did not make significant contribution to reduce the memory bandwidth.

The second CNN was SACNet, which deals with larger data than LeNet. It has the input image size of 3×56×56. The data cannot be loaded into the internal memory most of the time throughout the multiple convolution layers. The optimized policy shows more than 100% improvement on the memory bandwidth.

AlexNet is additionally a lot larger than the other two CNNs and has the input image size of 3×224×224. With the requirement of larger data bandwidth, the partitioning and replacement policy provided significant contribution to reduce the data traffic by more than 1000%. As shown in FIG. 20, the optimized policy produces significant improved results as the data sizes of the CNN increase.

Figure 21:
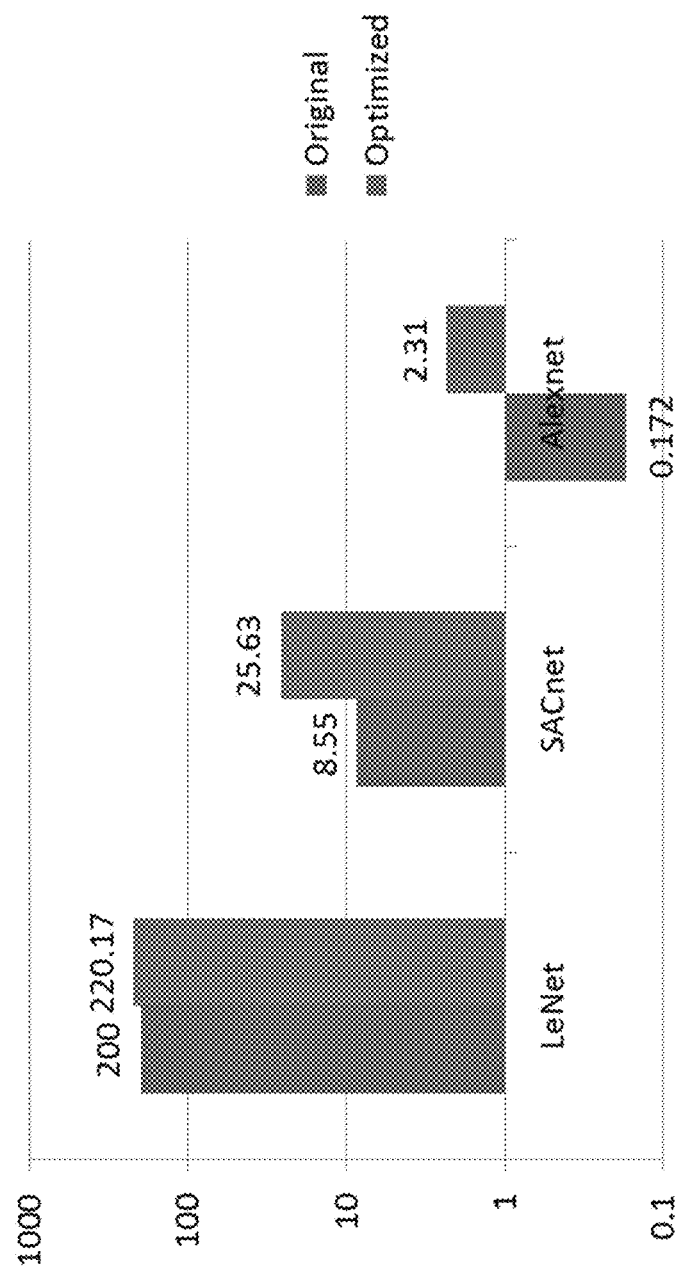

FIG. 21 shows the CNN performance in terms of the number of frames processed per second with the implementation of the original and the optimized policies compared. Due to the reduction in the memory bandwidth, the optimization policy of the present disclosure shows significant improvement. In the case of AlexNet, the optimized policy produces more than 1200% improvement in terms of the number of frames per second.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A computer implemented method for optimizing a convolutional layer of a convolutional neural network (CNN), the method comprising:

for each of a plurality of internal memory replacement schemes, wherein each internal memory replacement scheme identifies one of input feature map (IFM) data, kernel data, or output feature map (OFM) data to maintain in an internal memory until all calculations requiring said one of the IFM data, kernel data, or OFM data for the convolutional layer are completed, identify optimal data partition sizes of the IFM data, the kernel data, and the OFM data which minimizes a computation cost for the convolutional layer given each corresponding internal memory replacement scheme;

determining a combination of a selected one of the plurality of internal memory replacement schemes with corresponding optimal partition sizes of the IFM data, the kernel data, and the OFM data having a lowest computation cost among all combinations of the plurality of internal memory replacement schemes and corresponding optimal partition sizes; and implementing the CNN to use the selected one of the plurality of internal memory replacement schemes with the corresponding optimal partition sizes of the IFM data, the kernel data, and the OFM data for calculation of the convolutional layer.

2. The computer implemented method of claim 1, wherein each internal memory replacement scheme identifies:

a first one of IFM data, kernel data, or OFM data to maintain in the internal memory until all calculations requiring said one of the IFM data, kernel data, or OFM data for the convolutional layer are completed; and a second one of the IFM data, kernel data, or OFM data to prioritize over a third one of the IFM data, kernel data, or OFM data for managing the internal memory.

3. The computer implemented method of claim 1, wherein the plurality of internal memory replacement schemes comprises:

a first scheme wherein IFM data is maintained in the internal memory until all calculations requiring the IFM data for the convolutional layer are completed and kernel data is prioritized over OFM data for managing the internal memory;

a second scheme wherein IFM data is maintained in the internal memory until all calculations requiring the IFM data for the convolutional layer are completed and OFM data is prioritized over kernel data for managing the internal memory;

a third scheme wherein kernel data is maintained in the internal memory until all calculations requiring the kernel data for the convolutional layer are completed and IFM data is prioritized over OFM data for managing the internal memory;

a fourth scheme wherein kernel data is maintained in the internal memory until all calculations requiring the kernel data for the convolutional layer are completed and OFM data is prioritized over IFM data for managing the internal memory;

a fifth scheme wherein OFM data is maintained in the internal memory until all calculations requiring the OFM data for the convolutional layer are completed and IFM data is prioritized over kernel data for managing the internal memory; and a sixth scheme wherein OFM data is maintained in the internal memory until all calculations requiring the OFM data for the convolutional layer are completed and kernel data is prioritized over IFM data for managing the internal memory.

4. The computer implemented method of claim 3, wherein when the CNN is implemented to use the first scheme, the implemented CNN comprises:

iterating through a C loop where C corresponds to a number of channels of the IFM data;

within the C loop, iterating through an H loop where H corresponds to a height dimension of the IFM data;

within the H loop, iterating through a W loop where W corresponds to a width dimension of the IFM data;

within the W loop, loading an IFM partition of the IFM data into the internal memory and iterating through a K loop where K corresponds to a number of kernels; and within the K loop, loading a kernel partition of the kernel data into the internal memory, wherein CNN operations are performed within the K loop using the loaded IFM partition and the loaded kernel partition.

5. The computer implemented method of claim 3, wherein when the CNN is implemented to use the second scheme, the implemented CNN comprises:

iterating through an H loop where H corresponds to a height dimension of the IFM data;

within the H loop, iterating through a W loop where W corresponds to a width dimension of the IFM data;

within the W loop, iterating through a C loop where C corresponds to a number of channels of the IFM data;

within the C loop, loading an IFM partition of the IFM data into the internal memory and iterating through a K loop where K corresponds to a number of kernels; and within the K loop, loading a kernel partition of the kernel data into the internal memory, wherein CNN operations are performed within the K loop using the loaded IFM partition and the loaded kernel partition.

6. The computer implemented method of claim 3, wherein when the CNN is implemented to use the third scheme, the implemented CNN comprises:

iterating through a K loop where K corresponds to a number of kernels;

within the K loop, iterating through a C loop where C corresponds to a number of channels of the IFM data;

within the C loop, loading a kernel partition of the kernel data into the internal memory and iterating through an H loop where H corresponds to a height dimension of the IFM data;

within the H loop, iterating through a W loop where W corresponds to a width dimension of the IFM data; and within the W loop, loading an IFM partition of the IFM data into the internal memory, wherein CNN operations are performed within the K loop using the loaded IFM partition and the loaded kernel partition.

7. The computer implemented method of claim 3, wherein when the CNN is implemented to use the fourth scheme, the implemented CNN comprises:

iterating through a K loop where K corresponds to a number of kernels;

within the K loop, loading a kernel partition of the kernel data into the internal memory and iterating through an H loop where H corresponds to a height dimension of the IFM data;

within the H loop, iterating through a W loop where W corresponds to a width dimension of the IFM data;

within the W loop, iterating through a C loop where C corresponds to a number of channels of the IFM data; and within the C loop, iterating through an H loop where H corresponds to a height dimension of the IFM data; loading an IFM partition of the IFM data into the internal memory, wherein CNN operations are performed within the C loop using the loaded IFM partition and the loaded kernel partition.

8. The computer implemented method of claim 3, wherein when the CNN is implemented to use the fifth scheme, the implemented CNN comprises:

iterating through an H loop where H corresponds to a height dimension of the IFM data;

within the H loop, iterating through a W loop where W corresponds to a width dimension of the IFM data;

within the W loop, iterating through a K loop where K corresponds to a number of kernels;

within the K loop, iterating through a C loop where C corresponds to a number of channels of the IFM data; and within the C loop, loading an IFM partition of the IFM data into the internal memory and loading a kernel partition of the kernel data into the internal memory, wherein CNN operations are performed within the C loop using the loaded IFM partition and the loaded kernel partition.

9. The computer implemented method of claim 3, wherein when the CNN is implemented to use the sixth scheme, the implemented CNN comprises:

iterating through a K loop where K corresponds to a number of kernels;

within the K loop, loading a kernel partition of the kernel data into the internal memory and iterating through an H loop where H corresponds to a height dimension of the IFM data;

within the H loop, iterating through a W loop where W corresponds to a width dimension of the IFM data;

within the W loop, iterating through a C loop where C corresponds to a number of channels of the IFM data; and within the C loop, loading an IFM partition of the IFM data into the internal memory, wherein CNN operations are performed within the C loop using the loaded IFM partition and the loaded kernel partition.

10. The computer implemented method of claim 1, wherein the calculation cost comprises at least one of system throughput or memory bandwidth between the internal memory and an external memory.

11. The computer implemented method of claim 1, wherein identifying the optimal partition sizes for each corresponding internal memory replacement scheme comprises:
identifying all possible combinations of partition sizes of the IFM data, the kernel data, and the OFM data;
for each combination of the all possible combinations, calculating the convolutional layer using the corresponding internal memory replacement scheme and the corresponding possible combination; and
identifying the combination of partition sizes resulting in a minimum computation cost for calculating the convolutional layer.

12. The computer implemented method of claim 11, wherein:
the internal memory comprises an IFM memory partition, a kernel memory partition, and an OFM memory partition each having predetermined sizes; and
the identified all possible combinations of partition sizes comprises only partition sizes of the IFM data which are less than or equal to a size of the IFM memory partition and partition sizes of the kernel data which are less than or equal to a size of the kernel memory partition.

13. The computer implemented method of claim 12, wherein for an internal memory replacement scheme in which the OFM data is maintained in the internal memory, the identified all possible combinations of partition sizes comprises only partition sizes of the OFM data which are less than or equal to a size of the OFM memory partition.

14. The computer implemented method of claim 1, wherein when all calculations requiring a first partition of the IFM data are completed for the convolutional layer using an internal memory replacement scheme in which the OFM data is maintained in the internal memory:
the first partition is evacuated from the internal memory; and
a second partition of the IFM data is loaded into the internal memory,
wherein the second partition is offset from the first partition in a depth direction of a volume of the IFM data.

15. The computer implemented method of claim 1, wherein the CNN is implemented to use the selected one of the plurality of internal memory replacement schemes with the corresponding optimal partition sizes to calculate all convolutional layers of the CNN.

16. The computer implemented method of claim 1, wherein the CNN is implemented such that a combination of an internal memory replacement scheme and corresponding optimal partition sizes is selected for computing each convolutional layer of the CNN.

17. A machine-readable non-transitory medium having stored thereon machine-executable instructions for optimizing a convolutional layer of a convolutional neural network (CNN), the instructions comprising:
for each of a plurality of internal memory replacement schemes, wherein each internal memory replacement scheme identifies one of input feature map (IFM) data, kernel data, or output feature map (OFM) data to maintain in an internal memory until all calculations requiring said one of the IFM data, kernel data, or OFM data for the convolutional layer are completed, identify optimal data partition sizes of the IFM data, the kernel data, and the OFM data which minimizes a computation cost for the convolutional layer given each corresponding internal memory replacement scheme;
determining a combination of a selected one of the plurality of internal memory replacement schemes with corresponding optimal partition sizes of the IFM data, the kernel data, and the OFM data having a lowest computation cost among all combinations of the plurality of internal memory replacement schemes and corresponding optimal partition sizes; and
implementing the CNN to use the selected one of the plurality of internal memory replacement schemes with the corresponding optimal partition sizes of the IFM data, the kernel data, and the OFM data for calculation of the convolutional layer.

18. The machine-readable non-transitory medium of claim 17, wherein each internal memory replacement scheme identifies:
a first one of IFM data, kernel data, or OFM data to maintain in the internal memory until all calculations requiring said one of the IFM data, kernel data, or OFM data for the convolutional layer are completed; and
a second one of the IFM data, kernel data, or OFM data to prioritize over a third one of the IFM data, kernel data, or OFM data for managing the internal memory.

19. The machine-readable non-transitory medium of claim 17, wherein the plurality of internal memory replacement schemes comprises:
a first scheme wherein IFM data is maintained in the internal memory until all calculations requiring the IFM data for the convolutional layer are completed and kernel data is prioritized over OFM data for managing the internal memory;
a second scheme wherein IFM data is maintained in the internal memory until all calculations requiring the IFM data for the convolutional layer are completed and OFM data is prioritized over kernel data for managing the internal memory;
a third scheme wherein kernel data is maintained in the internal memory until all calculations requiring the kernel data for the convolutional layer are completed and IFM data is prioritized over OFM data for managing the internal memory;
a fourth scheme wherein kernel data is maintained in the internal memory until all calculations requiring the kernel data for the convolutional layer are completed and OFM data is prioritized over IFM data for managing the internal memory;
a fifth scheme wherein OFM data is maintained in the internal memory until all calculations requiring the OFM data for the convolutional layer are completed and IFM data is prioritized over kernel data for managing the internal memory; and
a sixth scheme wherein OFM data is maintained in the internal memory until all calculations requiring the OFM data for the convolutional layer are completed and kernel data is prioritized over IFM data for managing the internal memory.

20. The machine-readable non-transitory medium of claim 19, wherein when the CNN is implemented to use the first scheme, the implemented CNN comprises:
iterating through a C loop where C corresponds to a number of channels of the IFM data;

within the C loop, iterating through an H loop where H corresponds to a height dimension of the IFM data;

within the H loop, iterating through a W loop where W corresponds to a width dimension of the IFM data;

within the W loop, loading an IFM partition of the IFM data into the internal memory and iterating through a K loop where K corresponds to a number of kernels; and within the K loop, loading a kernel partition of the kernel data into the internal memory, wherein CNN operations are performed within the K loop using the loaded IFM partition and the loaded kernel partition.

21. The machine-readable non-transitory medium of claim 19, wherein when the CNN is implemented to use the second scheme, the implemented CNN comprises:

iterating through an H loop where H corresponds to a height dimension of the IFM data;

within the H loop, iterating through a W loop where W corresponds to a width dimension of the IFM data;

within the W loop, iterating through a C loop where C corresponds to a number of channels of the IFM data;

within the C loop, loading an IFM partition of the IFM data into the internal memory and iterating through a K loop where K corresponds to a number of kernels; and within the K loop, loading a kernel partition of the kernel data into the internal memory, wherein CNN operations are performed within the K loop using the loaded IFM partition and the loaded kernel partition.

22. The machine-readable non-transitory medium of claim 19, wherein when the CNN is implemented to use the third scheme, the implemented CNN comprises:

iterating through a K loop where K corresponds to a number of kernels;

within the K loop, iterating through a C loop where C corresponds to a number of channels of the IFM data;

within the C loop, loading a kernel partition of the kernel data into the internal memory and iterating through an H loop where H corresponds to a height dimension of the IFM data;

within the H loop, iterating through a W loop where W corresponds to a width dimension of the IFM data; and within the W loop, loading an IFM partition of the IFM data into the internal memory, wherein CNN operations are performed within the K loop using the loaded IFM partition and the loaded kernel partition.

23. The machine-readable non-transitory medium of claim 19, wherein when the CNN is implemented to use the fourth scheme, the implemented CNN comprises:

iterating through a K loop where K corresponds to a number of kernels;

within the K loop, loading a kernel partition of the kernel data into the internal memory and iterating through an H loop where H corresponds to a height dimension of the IFM data;

within the H loop, iterating through a W loop where W corresponds to a width dimension of the IFM data;

within the W loop, iterating through a C loop where C corresponds to a number of channels of the IFM data; and within the C loop, iterating through an H loop where H corresponds to a height dimension of the IFM data; loading an IFM partition of the IFM data into the internal memory, wherein CNN operations are performed within the C loop using the loaded IFM partition and the loaded kernel partition.

24. The machine-readable non-transitory medium of claim 19, wherein when the CNN is implemented to use the fifth scheme, the implemented CNN comprises:

iterating through an H loop where H corresponds to a height dimension of the IFM data;

within the H loop, iterating through a W loop where W corresponds to a width dimension of the IFM data;

within the W loop, iterating through a K loop where K corresponds to a number of kernels;

within the K loop, iterating through a C loop where C corresponds to a number of channels of the IFM data; and within the C loop, loading an IFM partition of the IFM data into the internal memory and loading a kernel partition of the kernel data into the internal memory, wherein CNN operations are performed within the C loop using the loaded IFM partition and the loaded kernel partition.

25. The machine-readable non-transitory medium of claim 19, wherein when the CNN is implemented to use the sixth scheme, the implemented CNN comprises:

iterating through a K loop where K corresponds to a number of kernels;

within the K loop, loading a kernel partition of the kernel data into the internal memory and iterating through an H loop where H corresponds to a height dimension of the IFM data;

within the H loop, iterating through a W loop where W corresponds to a width dimension of the IFM data;

within the W loop, iterating through a C loop where C corresponds to a number of channels of the IFM data; and within the C loop, loading an IFM partition of the IFM data into the internal memory, wherein CNN operations are performed within the C loop using the loaded IFM partition and the loaded kernel partition.

26. The machine-readable non-transitory medium of claim 17, wherein the calculation cost comprises at least one of system throughput or memory bandwidth between the internal memory and an external memory.

27. The machine-readable non-transitory medium of claim 17, wherein for identifying the optimal partition sizes for each corresponding internal memory replacement scheme, the instructions further comprise:

identifying all possible combinations of partition sizes of the IFM data, the kernel data, and the OFM data;

for each combination of the all possible combinations, calculating the convolutional layer using the corresponding internal memory replacement scheme and the corresponding possible combination; and identifying the combination of partition sizes resulting in a minimum computation cost for calculating the convolutional layer.

28. The machine-readable non-transitory medium of claim 27, wherein:

the internal memory comprises an IFM memory partition, a kernel memory partition, and an OFM memory partition each having predetermined sizes; and the identified all possible combinations of partition sizes comprises only partition sizes of the IFM data which are less than or equal to a size of the IFM memory partition and partition sizes of the kernel data which are less than or equal to a size of the kernel memory partition.

29. The machine-readable non-transitory medium of claim 28, wherein for an internal memory replacement scheme in which the OFM data is maintained in the internal memory, the identified all possible combinations of partition sizes comprises only partition sizes of the OFM data which are less than or equal to a size of the OFM memory partition.

30. The machine-readable non-transitory medium of claim 17, wherein when all calculations requiring a first partition of the IFM data are completed for the convolutional layer using an internal memory replacement scheme in which the OFM data is maintained in the internal memory:
the first partition is evacuated from the internal memory; and
a second partition of the IFM data is loaded into the internal memory,
wherein the second partition is offset from the first partition in a depth direction of a volume of the IFM data.

31. The machine-readable non-transitory medium of claim 17, wherein the CNN is implemented to use the selected one of the plurality of internal memory replacement schemes with the corresponding optimal partition sizes to calculate all convolutional layers of the CNN.

32. The machine-readable non-transitory medium of claim 17, wherein the CNN is implemented such that a combination of an internal memory replacement scheme and corresponding optimal partition sizes is selected for computing each convolutional layer of the CNN.

33. A computer implemented method for optimizing an internal memory for calculation of a convolutional layer of a convolutional neural network (CNN), the method comprising:

determining a computation cost of calculating the convolutional layer using each combination of a memory management scheme of a plurality of memory management schemes and data partition sizes of input feature map (IFM) data, kernel data, and output feature map (OFM) data to be loaded in the internal memory;
identifying one combination of a memory management scheme and data partition sizes having a lowest computation cost for the convolutional layer; and
implementing the CNN to use the one combination for calculation of the convolutional layer.

34. The computer implemented method of claim 33, wherein each memory management scheme identifies:
a first one of IFM data, kernel data, or OFM data to maintain in the internal memory until all calculations requiring said one of the IFM data, kernel data, or OFM data for the convolutional layer are completed; and
a second one of the IFM data, kernel data, or OFM data to prioritize over a third one of the IFM data, kernel data, or OFM data for managing the internal memory.

35. The computer implemented method of claim 33, wherein determining the data partition sizes comprises:
identifying a plurality of combinations of partition sizes of the IFM data, the kernel data, and the OFM data;
for each combination of the plurality of combinations, calculating the convolutional layer using each memory management scheme and the corresponding combination of partition sizes; and
identifying the combination of partition sizes resulting in a minimum computation cost for calculating the convolutional layer.

* * * * *